United States Patent [19]
Smyth

[11] Patent Number: 5,465,321
[45] Date of Patent: Nov. 7, 1995

[54] HIDDEN MARKOV MODELS FOR FAULT DETECTION IN DYNAMIC SYSTEMS

[75] Inventor: Padhraic J. Smyth, Altadena, Calif.

[73] Assignee: The United States of America as represented by the Administrator of the National Aeronautics and Space Administration, Washington, D.C.

[21] Appl. No.: 47,135

[22] Filed: Apr. 7, 1993

[51] Int. Cl.⁶ ...................................................... G06F 15/80
[52] U.S. Cl. ............................ 395/22; 364/578; 395/911; 395/914
[58] Field of Search ........................ 364/550, 578, 364/185; 395/22, 2.41, 2.65, 911, 914; 382/14, 30, 37

[56] References Cited

U.S. PATENT DOCUMENTS

| | | | |
|---|---|---|---|
| 3,828,171 | 8/1974 | Griffin | 235/151.12 |
| 3,891,836 | 6/1975 | Lee | 235/150.1 |
| 3,967,515 | 7/1976 | Nachtigal et al. | 82/2 B |
| 4,213,175 | 7/1980 | Kurihara | 364/119 |
| 4,607,325 | 8/1986 | Horn | 364/151 |
| 4,669,083 | 5/1987 | Laviron | 371/23 |
| 4,727,549 | 2/1988 | Tulpate et al. | 371/62 |
| 4,755,925 | 7/1988 | Tsuchiya et al. | 364/150 |
| 4,791,548 | 12/1988 | Yoshikawa et al. | 364/149 |
| 4,888,703 | 12/1989 | Baba et al. | 364/496 |
| 5,067,099 | 11/1991 | McCown et al. | 364/550 |
| 5,101,337 | 3/1992 | Ebizuka | 364/184 |
| 5,115,396 | 5/1992 | Keegan | 364/431.04 |
| 5,119,468 | 6/1992 | Owens | 395/22 |
| 5,309,379 | 5/1994 | Rawlings et al. | 364/578 |

OTHER PUBLICATIONS

Arriola, et al, "Integration of Multi–layer Perception and Recognition," UK IT, 12–22 Mar. 1990, 413–420.

Morgan, et al, "Continuous Speech Recognition Using Multilayer Perceptions With Hidden Markov Models," ICASSP '90, Apr. 1990, 413–416.

Franzini, et al, "Connectionist Viterbs Training=Speech Recognition," ICASSP '90, Apr. 1990, 425–428.

Bridle, J. S., "Training Stochastic Model Recognition Algorithms as Networks can lead to Maximum Mutual Information Estimation of Parameters," Advances in Neural Information Processing Systems 2, 1990, 211–217.

Bengio, et al, "Global Optimization of a Neural Network—Hidden Markov Model Hybrid," 1991 IEEE Int'l. Conf. Neural Networks, Jul. 1991, II—789–794.

Franzini, et al, "Continuous Speech Recognition with the Connectionist Viterbi Training Procedure=A Summary of Recent Work," 1991 IEEE Int'l. Conf. Neural Networks, Nov. 1991, 1855–1860.

A. S. Willsky, "A Survey of design methods for failure detection in dynamic systems," Automatica, pp. 601–611, 1976.

R. Isermann, "Process fault detection based on modeling and estimation methods—a survey," Automatica, vol. 20, 387–404, 1984.

P. M. Frank, "Fault diagnosis in dynamic systems using analytical and knowledge–based redundancy—a survey and some new results".
Automatica, vol. 26, No. 3, pp. 459–474, 1990.

(List continued on next page.)

Primary Examiner—Robert W. Downs
Attorney, Agent, or Firm—John H. Kusmiss

[57] ABSTRACT

The invention is a system failure monitoring method and apparatus which learns the symptom-fault mapping directly from training data. The invention first estimates the state of the system at discrete intervals in time. A feature vector x of dimension k is estimated from sets of successive windows of sensor data. A pattern recognition component then models the instantaneous estimate of the posterior class probability given the features, $p(w_i/x)$, $1 \leq i \leq m$. Finally, a hidden Markov model is used to take advantage of temporal context and estimate class probabilities conditioned on recent past history. In this hierarchical pattern of information flow, the time series data is transformed and mapped into a categorical representation (the fault classes) and integrated over time to enable robust decision-making.

30 Claims, 11 Drawing Sheets

OTHER PUBLICATIONS

Ng, K. and R. P. Lippman, "A comparative study of the practical characteristics of neural network classifiers and conventional pattern classifiers," in Advances in Neural Information Processsing 3, R. P. Lippman, J. Moody, D. S. Touretzky (eds.), Los Gatos, Calif.: Margan Kaufmann, 970–976, 1991.

S. M. Weiss and I. Kapouleas, "An empirical, comparison of pattern recognition, neural nets, and machine learning classification methods," Proceedings of International Joint Conference on Artificial Intelligence 1989, Palo Alto, Calif.: Morgan Kauffmann, pp. 781–787, 1989.

F. J. Pineda, "Dynamics and control in neural computation," Journal of Complexity, vol. 4, pp. 216–245, 1988.

B. Pearlmutter, "Learning state–space trajectories in recurrent neural networks," Neural Computation, vol. 1, No. 2, pp. 263–269, 1989.

A. Wailbel, T. Hanazawa, G. Hinton, K. Shikano, and K. Lang, "Phoneme recognition using time–delay neural networks," IEEE Trans. Acoustics, Speech, Sig. Processing, Mar. 1989.

L. R. Rabiner, "A tutorial on hidden Markov models and selected applications in speech recognition," Proc. IEEE, vol. 77, No. 2, pp. 257–286, Feb. 1989.

J. Miller, R. Goodman, and P. Smyth, "On loss functions which minimize to conditional expected values and posterior probabilities," IEEE Trans. Inform. Theory, to appear, (1993).

S. Geman, E. Bienenstock and R. Doursat, "Neural networks and the bias/variance dilemma," Neural Computation, 4, pp. 1–58, 1992.

P. Smyth and J. Mellstrom, "Fault diagnosis of antenna pointing systems using hybrid neural networks and signal processing techniques," in Advances in Neural Information Processing Systems L. P. Lippmann (ed.), Morgan Kaufmann Publication, Los Altos, Calif., 1992, pp. 667–674.

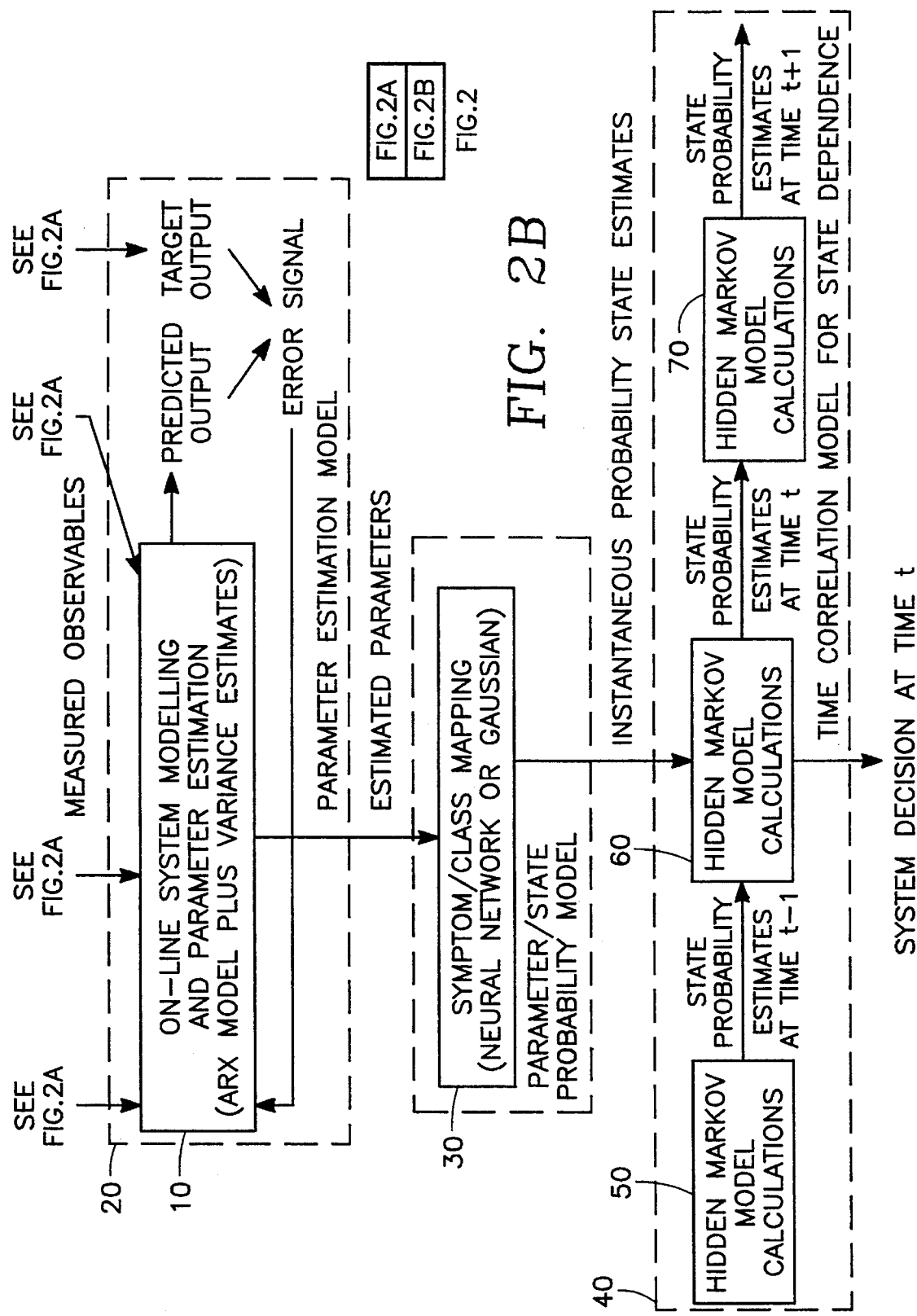

HIDDEN MARKOV MODELS FOR FAULT DETECTION IN DYNAMIC SYSTEMS

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

1. Technical Field

The invention relates to system monitoring apparatus employing intelligent classifiers such as neural networks responding to measured control inputs and system responses or symptoms causally related to tile control inputs for classifying the current state of the system relative to its known failure modes.

2. Background Art

References

The invention and its background will be described herein with reference to the following publications:

1. A. S. Willsky, 'A survey of design methods for failure detection in dynamic systems,' *Automatica*, pp.601–611, 1976.

2. R. Isermann, 'Process fault. detection based on modeling and estimation methods—a survey,' *Automatica*, vol. 20, 387–404, 1984.

3. P. M. Frank, 'Fault diagnosis in dynamic systems using analytical and knowledge-based redundancy—a survey and some new results,' *Automatica*, vol. 26, no.3, pp.459–474, 1990.

4. I. Bratko, I. Mozetic, and N. Lavrac, *A StUdy in Deep and Qualitative Knowledge for Expert Systems*, Cambridge, Mass.: MIT Press, 1989.

5. R. Davis, 'Diagnostic reasoning based on structure and behavior,' *Artificial Intelligence, vol.* 24, no.3, p.347–410, 1984.

6. Ng, K. and R. P. Lippmann, 'A comparative study of the practical characteristics of neural network classifiers and conventional pattern classifiers,' in *Advances in Neural Information Processing* 3, R. P. Lippmann, J. Moody, D. S. Touretzky (eds.), Los Gatos, Calif.: Morgan Kaufmann, 970–976, 1991.

7. S. M. Weiss and I. Kapouleas, 'An empirical comparison of pattern recognition, neural nets, and machine learning classification methods.' *Proceedings of International Joint Conference on Artificial Intelligence* 1989, Palo Alto, Calif. Morgan Kaufmann, pp.781–787, 1989.

8. F. J. Pineda, 'Dynamics and control in neural computation,' *Journal of Complexity*, vol. 4, pp.216–245, 1988.

9. B. Pearhnutter, 'Learning state-space trajectories in recurrent neural networks,' *Neural Computation*, vol. 1, no.2, pp.263–269, 1989.

10. A. Waibel, T. Hanazawa, G. Hinton, K. Shikano, and K. Lang, 'Phoneme recognition using time-delay neural networks,' *IEEE Trans. Acoustics. Speech, Sig. Processing*, March 1989.

11. I. A. Papazoglou and E. P. Gyftopoulos, 'Markov processes for reliability analyses of large systems,' *IEEE Trans. Reliability*, vol. R-26, pp.232–237, August, 1977.

12. L. R. Rabiner, 'A tutorial on hidden Markov models and selected applications in speech recognition,' *Proc. IEEE*, vol.77, no.2, pp.257–286. February 1989.

13. D. P. Siewiorek and R. S. Swarz, *The Theory and Practice of Reliable System Design*, Digital Press, 1982.

14. L. Ljung, *System Identification—Theory for the User*, Englewood Cliffs, N.J.: Prentice Hall, 1987.

15. R. L. Kashyap, 'Optimal feature selection and decision rules in classification problems with time series,' *IEEE. Trans. Inform. Theory*, vol. IT-24, no.3, pp.281–288, 1978.

16. M. D. Richard and R. P. Lippmann, 'Neural network classifiers estimate Bayesian a posteriori probabilities,' *Neural Computation*, 3(4), pp.461–483, 1992.

17. J. Miller, R. Goodman, and P. Smyth, 'On loss functions which minimize to conditional expected values and posterior probabilities,' *IEEE. Trans. Inform. Theory*, to appear.

18. E. Barnard and R. Cole, 'A neural net training program based on conjugate-gradient optimization,' Oregon Graduate Centre Technical Report. No. CSE 89–014, Oregon, 1989.

19. M. J. D. Powell, 'Restart procedures for the conjugate gradient method,' *Mathematical Programming*, vol. 12, pp.241–254, April 1977.

20. S. Geman, E. Bienenstock and R. Doursat, 'Neural networks and the bias/variance dilemma,' *Neural Computation*, 4, pp.1–58, 1992.

21. M. A. Kramer and J. A. Leonard, 'Diagnosis using backpropagation neural networks—analysis and criticism,' *Computers chem. Engng.*, vol. 14, no.12, pp.1323–1338, 1990.

22. P. Smyth and J. Mellstrom, 'Fault diagnosis of antenna pointing systems using hybrid neural networks and signal processing techniques,' in *Advances in Neural Information Processing System* 4, R. Lippmann (ed.), Morgan Kaufmann Publishers: Los Altos, Calif., 1992, pages 667–674.

Introduction

Continuous monitoring of complex dynamic systems is an increasingly important issue in diverse areas such as nuclear plant safety, production line reliability, and medical health monitoring systems. Recent, advances in both sensor technology and computational capabilities have made on-line permanent monitoring much more feasible than it was in the past.

Health monitoring of complex dynamic systems is a basic requirement in many domains where safety, reliability and longevity of the system under study are considered critical. The system of interest might be a nuclear power plant, a large antenna system, a telecommunications network or a human heart. Health monitoring can involve a variety of tasks such as detection of abnormal conditions, identification of faulty components, or prediction of impending failures. The availability at low cost of highly sensitive sensor technology, data acquisition equipment, and VLSI computational power, has made round-the-clock permanent monitoring an attractive alternative to the more traditional periodic manual inspection.

The specification will focus on the problem of accurately determining the state of the monitored system as a function of time. In particular, it is assumed that a sequence of observed sampled sensor readings $\gamma$ are available at uniformly-spaced discrete time intervals—without loss of generality the sampling interval is assumed to be 1. Each $\gamma$ is a k-dimensional measurement. Given a sequence of such sample vectors, $\gamma(t), \gamma(t-1), \ldots, \gamma(0)$, the task is to infer the current state of the system at time t.

It is assumed that the system must be in one, and only one, of a finite set of m states, $w_i$, $1 \leq i \leq m$, at any time. Let $\Omega$ be the discrete random variable corresponding to the (unobservable) state of the system, taking values in the set $\{w_1, \ldots, w_m\}$. Note that the words "states" and "classes" will both be used in this specification but refer to the same thing. One of these states is deemed "normal", the other m–1 correspond to fault conditions. This assumption, that the known fault classes are mutually exclusive and exhaustive, limits the proposed method to problems where only single-faults occur at any given time and all faults can be described in advance. The first limitation, single fault detection, is a known limitation of most fault detection methods and is inherent in the underlying nature of the sensor information available and the nature of the faults themselves. For example, it is possible that in some problems, multiple faults result in predictable combinations of single fault symptoms—however, this is usually a domain specific issue and is beyond the scope of discussion in this specification. In practice, since faults are often relatively rare compared to the sampling interval at which decisions are made, the probability of two independent faults occurring within the same time interval is extremely small. It will be shown below that the second limitation, the assumption that the known faults $\{w_2, \ldots, w_m\}$ comprise the set of all faults which could potentially occur, can be relaxed in a general domain-independent manner. It is also assumed throughout that the monitoring process of the invention is entirely passive and cannot effect any changes in the system.

Background on Fault Detection for Dynamic Systems

In the typical dynamic system fault detection problem certain signals are easily and directly measurable (the "sensors") while others may be unobservable for various physical and practical reasons. For some applications, direct statistical analysis of the observed signals is sufficient to detect all faults of interest. For example, it may be sufficient to detect a change in the mean value of a time series. However, it is more typical that the observed signals must be transformed in some manner in order to infer the relevant fault information. In the ideal cause where the system dynamics and measurement process can be completely modelled in an accurate manner, a variety of optimal control-theoretic methods for fault detection can be derived using on-line state estimation and statistical analysis of the residual error signals (see Willsky [1] for an overview of such methods). FIG. 1 is a block diagram of this method where u(t) is the system input and y(t) is the observed system output.

In practice, however, particularly for large complex systems, it is common to find that the system model may not be that reliable, if indeed there is any system model available. A common technique (Isermann [2], Frank [3]) is to fit a dynamic model to the relationship between the measured input and output signals of the system. In FIG. 1, u(t) and y(t) are the measured input and output signals respectively, and v(t) represents unmeasured disturbances to the system.

The model is often a linear difference equation (in the discrete time case) relating inputs and outputs, e.g., $$y(t) + \sum_{i=1}^{p} \alpha_i y(t-i) = \sum_{j=1}^{q} \beta_j u(t-i-\delta) + e(t) \quad (1)$$

where e(t) is an additive noise term, p and q are the orders of the model, and $\delta$ is a delay term. In this example the observed data at time t would be $\gamma(t) = \{u(t), y(t)\}$ and the model parameters would be denoted as $\theta = \{\alpha_1, \ldots, \alpha_p, \beta_1, \ldots, \beta_q\}$.

Typically the order or structure of the model (p and q) can be judiciously estimated based upon known system properties—however, the parameters $\theta$ of the model are estimated in an on-line manner using observed input/output data. The lumped parameters of the model can often be related to particular system components. Hence, fault detection occurs by observing changes in the values of the estimated parameter values of the fitted model (compared with some model of their normal condition), which in turn depend on the system components. This method has become known as the parameter method of fault detection—faults are detected by analyzing changes in the parameters of the fitted model. How much the parameter vector needs to change to be considered a real fault is the decision part of the problem and is beyond the scope of this specification, as it is a field for the application of statistical decision theory and pattern recognition (Frank [3]).

The focus of this specification is on the problem of detecting changes in the underlying system state from parameter estimates $\theta(t), \theta(t-1), \ldots$ using both data-derived estimates of the parameter-state dependence and prior knowledge of the temporal behavior of the system. As mentioned earlier the system is assumed to always be in one, but only one, state $w_i$, $1 \leq i \leq m$, at any point in time, i.e., the states are mutually exclusive and exhaustive. It is also assumed that the distribution of parameters conditioned on a given state, $p(\theta|\Omega = w_i)$ (where both are measured at the same time t) is stationary, but that there may be some overlap of these state-conditional distributions. This specification will refer to the dependence $p(\theta|\Omega = w_i)$ as the instantaneous model between the parameters and states. In the case of complete overlap (where two or more states possess identical distributions) there is naturally no way to identify the underlying states just by observing the parameters and knowing the instantaneous model. However, as will be shown later in this specification, even when there is significant overlap in the instantaneous model, accurate state identification is still possible by taking temporal context into account using a hidden Markov model.

It will be assumed herein that the application is such that a database or fault library can be generated for both the normal class $w_1$ and the fault classes $\{w_2, \ldots, w_m\}$. The database consists of pairs of symptom vectors and class labels, $\{\theta, \Omega(\theta)\}$, where $\theta$ is the d-dimensional parameter vector estimated from the observed system data. Note that the mapping from $\theta$ to $\Omega(\theta)$ need not be one-to-one, since the conditional dependence of $\theta$ given that $\Omega(\theta) = w_i$ is typically probabilistic in nature.

The assumption of availability of labelled training data rules out, applications where it is not possible to gather such data— perhaps no such data has been collected in tile past and it is not possible to simulate faults in a controlled manner. However, there are many applications where either a fault library already exists, or can be created under controlled conditions (perhaps by testing a particular system in a laboratory). The important point is that for fault diagnosis problems for which such symptom-fault data is readily available, standard supervised classification or discrimination methods can be used to learn a fault diagnosis model from this database.

It is important to note that the parameter estimation technique generally requires far less precise knowledge about the system than the previously-mentioned state-space approach and, hence, tends to be both more widely applicable and more robust from a practical standpoint. For example, in the case of tile antenna monitoring problem to be described later, both the presence of non-linearities and the inherent complexity of the system make it difficult to develop an accurate state-space model. In contrast, the parameter model method can be implemented with relative ease. Naturally, if there is enough knowledge of the system available such that the state-space approach is feasible, then this should give better results since it takes advantage of more information.

As an aside, mention should also be made of knowledge-based or artificial intelligence models which employ qualitative models of system behavior to detect faults. First-generation knowledge-based systems typically use experiential heuristics (described in the form of expert-supplied rules) to describe symptom-fault relationships. More sophisticated second-generation methods (under the broad heading of "model-based reasoning") use qualitative causal models of the system to represent "first-principles" knowledge (Bratko, Mozetic and Lavrac [4] and Davis [5]). In principle, this allows the system to identify faults which have never occurred before. Both approaches have limited applicability at present in terms of handling the dynamic and uncertain nature of many real-world problems. In general, the qualitative symbolic representation is not particularly robust for dealing with noisy, continuous data containing temporal dependencies. Furthermore there are many applications for which neither domain experts nor strong causal models exist, thus making the development of a knowledge-base very difficult.

SUMMARY OF THE DISCLOSURE

The present invention learns the symptom-fault mapping directly from training data. The invention first estimates the state of the system at discrete intervals in time. A feature vector $\theta$ of dimension k is estimated from sets of successive windows of sensor data. A pattern recognition component then models the instantaneous estimate of the posterior class probability given the features, $p(w_i|\theta)$, $1 \leq i \leq m$. Finally, a hidden Markov model is used to take advantage of temporal context and estimate class probabilities conditioned on recent past history. In this hierarchical pattern of information flow, the time series data is transformed and mapped into a categorical representation (the fault classes) and integrated over time to enable robust decision-making. It is quite generic to systems which must passively sense and monitor their environment in real-time.

The invention is a method of monitoring a system having a normal working state corresponding to normal operation of the system and a plurality of individual failure states corresponding to different failure modes of the system, the system exhibiting respective sets of measurable parameters including inputs and behavior symptoms causally related to the inputs. The method begins by defining plural transition probabilities for plural pairs of the states, each transition probability being related to the probability that the system will change from one to the other of the pairs of states at any time. The method continues with observing a set actual values of the parameters in a current one of the sampling intervals. From this, an instantaneous probability is obtained which is an estimate of the probability of one of (a) the set of actual values being observed and (b) the system being in the one state, given the other of (a) and (b). Plural respective intermediate probabilities are then computed corresponding to respective ones of the states, each intermediate probability being equal to the corresponding instantaneous probability of the one state multiplied by a sum over plural states of the intermediate probability for a given state computed during the previous sampling interval multiplied by the transition probability between the given state and the one state. Finally, a posterior probability that the system is in one of the states given the sets of actual values observed over the current and previous sampling intervals is computed for each state from the intermediate probability of the current sampling interval for states. Whether the system is in a failure state is determined by comparing the posterior probabilities of all the states, and an indication thereof is issued.

In one embodiment, the instantaneous probability is an instantaneous estimate of the probability that the system is in the one state given the set of actual measurements, divided by an unconditional probability of the system being in the one state. In this embodiment, computing a posterior probability is performed by equating the posterior probability with the intermediate probability computed for the current sampling interval.

In another embodiment of the invention, the instantaneous probability is a probability of the actual values of the current sampling interval being observed given the system being in the one state. In this latter embodiment, computing the posterior probability is performed by dividing the intermediate probability by an unconditional probability of observing the sets of actual values of the current and previous sampling intervals.

In this latter embodiment, the instantaneous probability may be obtained by first obtaining from a classifier responsive to the parameters an instantaneous estimate of the probability that the system is in the one state given the set of actual measurements; and then transforming the classifier's instantaneous estimate to the instantaneous probability using Bayes' rule. On the other hand, the instantanous probability may be obtained directly from a classifier trained to output the instantaneous probability for each state in response to the set of actual values.

Defining plural transition probabilities includes observing a mean time between failures (MTBF) characteristic of each of the failure states and computing each corresponding transition probability therefrom. Computing the corresponding transition probability includes dividing the time period of the sampling intervals by the MTBF and subtracting the resulting quotient from unity.

Obtaining an instantaneous probability for each one of the states includes observing the frequency of each failure state of the system and the corresponding parameter values over a period of time relatively long compared to the sampling intervals, constructing a training data set associating the frequency of each failure state with different sets of corresponding parameter values, and using a classification algorithm operating on the training data to infer from the parameter values observed during the current sampling interval the instantaneous probabilities of the current sampling interval.

The classification algorithm directly provides an instantaneous probability for each one of the states that the system is in the respective state given the set of parameter values observed during the current sampling interval. Using the classification algorithm includes transforming the instantaneous probabilities to the instantaneous probabilities using Bayes' rule. It further requires, in one embodiment, training a neural network on the set of training data, and then inputting the parameter values of the current sampling interval to the neural network while permitting the neural network to infer the instantaneous probabilities of the current sampling interval.

In another embodiment, obtaining an instantaneous probability for a failure state is accomplished without training data related to that failure state and accomplished by determining for each parameter of that failure state upper and lower bounds on the possible values thereof, and computing the instantaneous probability of that failure state from the upper and lower bounds. Computing of the instantaneous probabilities includes multiplying together all reciprocals of the differences between the upper and lower bounds of the parameters of that failure state. Preferably, in this embodiment, there are only two system states: a normal state and a failure state.

In a preferred implementation, observing the parameters includes monitoring measurements of input commands and performance variables of the system and converting the measurements to parameters indicative of changes in the measurements. The parameters can include autoregressive coefficients of the measurements, variances of the measurements and mean values of the measurements.

The computing of the posterior probabilities from the intermediate probabilities includes, for the posterior probability of the observed set of parameter values given each state of the system, dividing the intermediate probability of the corresponding state given the observed set of parameter values by a probability of observing the observed set of parameter values.

BRIEF DESCRIPTION OF THE DRAWINGS

FIG. 2 is a block diagram of an apparatus embodying the present invention, of which FIG. 2A illustrates an antenna pointing system being monitored and FIG. 2B illustrates fault detection apparatus embodying the invention.

DETAILED DESCRIPTION OF THE PREFERRED EMBODIMENTS

Learning Symptom-Fault Mappings

Figures 1, 7:
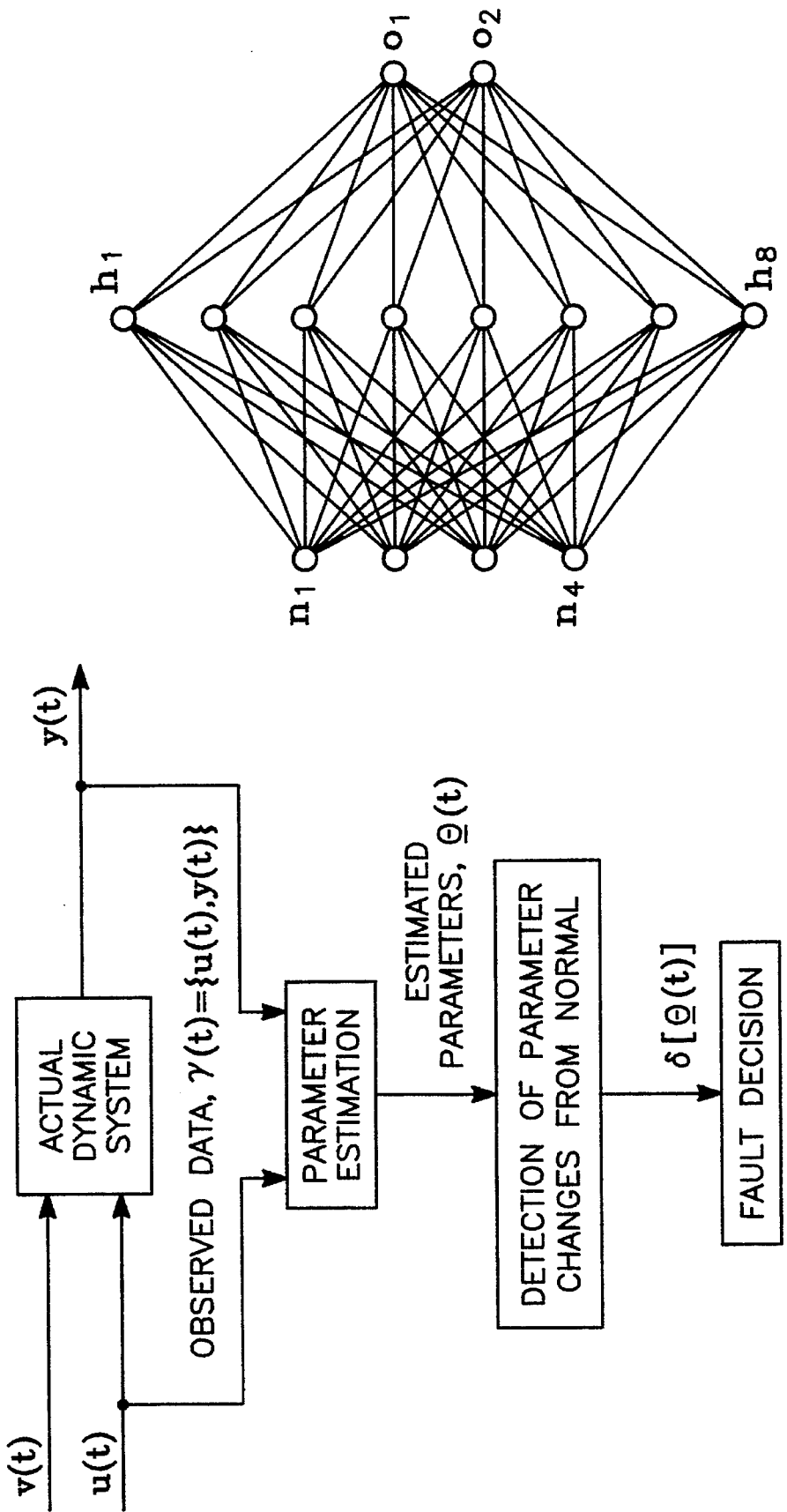
FIG. 1 is a diagram illustrating a method of fault detection of the prior art.
FIG. 7 is a diagram of a neural network employed in combination with the invention.

This specification focuses on the use of the general parameter estimation method. In particular, for the purposes of this specification, the estimated parameters or "symptoms" of the system correspond directly to the feature vector representation in a classic pattern recognition model and are derived from the original observable sensor data $\theta(t)$. In turn, the system states (normal and fault conditions) correspond to classes.

The details of the particular classification model used to generate the symptom-fault mapping are not directly relevant to the general discussion. If there is prior knowledge that the probability dependence of the symptoms conditioned on the faults obeys a particular parametric form, such as multi-variety Gaussian, then a maximum-likelihood method to estimate the parameters of the conditional distributions may be appropriate. More commonly there is little prior knowledge regarding the symptom-fault dependencies. In this case non-parametric discriminative methods such as linear discriminants, nearest-neighbor (kNN) methods, decision trees, or neural networks may all be useful approaches depending on the exact nature of the problem at hand. Recent studies using several well known data sets have shown that all of these classification models perform roughly equally well in terms of predictive accuracy, i.e., their classification performance on independent test data sets was often statistically indistinguishable from each other (Ng and Lippmann [6], Weiss and Napoulcas [7]). Hence, other attributes of the classification method such as complexity, the ability to handle high dimensional problems, small-sample performance, explicit knowledge representation, and so forth, can become the deciding factors for a given application.

One particular requirement is imposed on the classification method to be used, namely that it produce estimates of the posterior probabilities of the classes $w_i$, $1 \leq i \leq m$, given the input symptoms $\theta$, i.e., $\hat{p}(\Omega=w_i|\theta)$. In many practical applications estimation of posterior probabilities (as opposed to a simple indication of which class is most likely) is very useful to allow one to control the false alarm rate, the rejection rate, and so forth.

Rather than deal with the time series data directly one usually seeks to extract invariant characteristics of the time series waveforms, where the invariance is with respect to different environmental conditions of operation of the system conditioned on a particular class. These invariant characteristics correspond directly to the estimated system parameters discussed earlier, i.e., what are called system parameters in the control literature can be treated as feature vectors for readers more familiar with pattern recognition terminology. This feature extraction stage can critically affect the classification performance of the overall system. Note that the terms symptoms and features are used interchangeably herein.

One feature extraction method is employed whereby the data is windowed into separate consecutive blocks, each containing an integer number T samples. Many variations of this sampling scheme are possible, for example, the use of overlapping blocks or recursive estimators. This specification is confined to the relatively simple case of disjoint, consecutive blocks, each of which contain T samples. In practice T is chosen to be large enough to give reasonably accurate estimates of the features so as to reduce the sampling variance across different windows. For autoregressive models such as Equation (1), the $\theta$ coefficients are estimated from all of the observations in a given window of consecutive samples using standard methods such as least squares estimation, i.e., $$\theta(t)=f(\gamma(t),\gamma(t-1), \ldots ,\gamma(t-(T-1))),$$

$$\theta(t-T)=f(\gamma(t-T),\gamma(t-(T+1)), \ldots ,\gamma(t-(2T-1))), \quad (2)$$

and so forth.

What has been expressed at this point, assuming that a particular estimation method and classification algorithm had been chosen, is simply a framework for generating estimates of the state of the system at any point in time, i.e., at intervals of time T the classification system will produce estimates of the posterior class probabilities given the features which are estimated over the [t,t–T] time interval. This approach makes an independent decision at each time instant, i.e., class probability estimates or symptom data from the past do not influence the present estimates. Clearly this is suboptimal given the fact that faults are persistent over time and, hence, that better class estimates could be obtained by making use of past information. Two obvious approaches spring to mind in order to model this temporal context. In the first, one could introduce some form of memory into the classification model. Examples of such memory methods include recurrent neural networks (i.e., networks where the outputs are fed back to the inputs after a unit delay, as in Pineda [8], Pearlmutter [9] or a "window in time" technique whereby the classifier is trained not only on feature values at time t, but also on values from time t–T back to t–MT where M is the memory of the model (Waibel et al. [10]). This approach of implicitly modelling temporal context has the significant disadvantage of making it much more difficult to train the classifier. The second approach (which is now described), of using a hidden Markov model, is much more elegant in that it combines over time the instantaneous estimates of the trained classifier by taking advantage of prior knowledge about the gross statistical properties of the failure modes of the system.

Hidden Markov models for modelling temporal context

The use of discrete-time, finite-state, hidden Markov models for smoothing classification decisions over time is now described. Note that for the purposes of this discussion the terms "class" and "state" are equivalent, i.e., both refer to tile set of normal and fault conditions $\{w_1, \ldots ,\}$.

A first-order temporal Markov model is characterized (in the present context) by the assumption that $$p(\Omega(t)=w_i|\Omega(t-T), \ldots ,\Omega(0))=p(\Omega(t)=w_i|\Omega(t-T)), 1\leq i\leq m, \quad (3)$$

for all t.

This means that the conditional probability of any current state given knowledge of all previous states is the same as the conditional probability of the current state given knowledge of the system state at time t–T. Hence, assuming stationarity, to calculate the probability of any state at time t, one need only know the initial state probabilities $\pi(0)=[p(\Omega(0)=w_1), p(\Omega(0)=w_2), \ldots , p(\Omega(0)=w_m)]$ and the values $p(\Omega(t)=w_i|\Omega(t-T)=w_j)$, $1\leq i,j\leq m$. The $m\times m$ matrix A, where $a_{ij}=p(\Omega(t)=w_i|\Omega(t-T)=w_j)$, is known as the transition matrix and characterizes the Markov model. Given A and $\pi$ one can calculate the probability of any state at any time t.

It is now assumed at this point of the discussion that the discrete-time Markov model described above can be used to model the failure behavior of the system of interest, i.e., at any time t, given that the system is in a particular state j, the probability that the system will be in state i at time t+T is described by the state transition probability $a_{ij}=p(\Omega(t)=w_i|\Omega(t-T)=w_j)$. The implications of using such a model and the use of failure rates to estimate the transition probabilities will be discussed below. However, at this point, the specification focuses on how the model is used. Markov models such as this can be used for reliability analyses to determine long-term failure rates and modes of a system (Papazoglou and Gyftopoulos [11]).

However, the goal here is somewhat different, namely to monitor the system in real-time. The key point is that the states of the system are not directly observable, but, are hidden, i.e., the monitoring system has no direct way to measure the state of the system, even for past time. Instead, various symptoms or features $\theta(t)$ are observable. These features are a probabilistic function of the states: in fact the classification models mentioned earlier can estimate an instantaneous symptom-state mapping $p(\Omega(t)=w_i|\theta(t))$. By making the appropriate conditional independence assumptions, one can estimate $p(\Omega(t)=w_i|\theta(t),\theta(t),\theta(t-T) \ldots ,\theta(0))$ without explicitly providing the $\theta(t-T), \ldots ,\theta(0)$ as direct inputs to the classifier.

The hidden Markov formalism provides an exact solution to this problem provided the underlying conditional independence assumptions are met. It has been widely applied with significant success in speech-recognition applications (Rabiner [12]). Let the probability of the observed data be $p(\Phi_t)=p\{\theta(t), \ldots ,\theta(0)\}$. It is convenient to work in terms of an intermediate variable $\alpha$, where $$\alpha_i(t)=p(\Omega(t)=w_i,\Phi_t). \quad (4)$$

To find the posterior probabilities of interest it is sufficient to be able to calculate the $\alpha$'s at any time t since by Bayes' rule $$p(\Omega(t) = \omega_i|\Phi_t) = \frac{\alpha_i(t)}{p(\Phi_t)} = \frac{\alpha_i(t)}{\sum_{j=1}^{m} \alpha_j(t)}. \quad (5)$$

A recursive estimate is derived as follows:

$$\begin{aligned}
\alpha_i(t) &= \sum_{j=1}^{m} p(\Omega(t) = \omega_i, \Phi_t, \Omega(t - T) = \omega_j) \\
&= \sum_{j=1}^{m} p(\Omega(t) = \omega_i, \theta(t), \Phi_{t-T}, \Omega(t - T) = \omega_j) \\
&= \sum_{j=1}^{m} p(\Omega(t) = \omega_i, \theta(t)|\Phi_{t-T}, \Omega(t - T) = \omega_j)p(\Phi_{t-T}, \Omega(t - T) = \omega_j) \\
&= \sum_{j=1}^{m} p(\Omega(t) = \omega_i, \theta(t)|\Phi_{t-T}, (t - T) = \omega_j) \alpha_j(t - T) \text{(by definition of } \alpha_j) \\
&= \sum_{j=1}^{m} p(\theta(t)|\Omega(t) = \omega_i, \Phi_{t-T} = \omega_j) \times p(\Omega(t) = \omega_i|\Phi_{t-T}, \Omega(t - T) = \omega_j) a_j(t - T) \\
&= \sum_{j=1}^{m} p(\theta(t)|\Omega(t) = \omega_i)p(\Omega(t) = \omega_i|\Phi_{t-T}, \Omega(t - T) = \omega_j) \alpha_j(t - T)
\end{aligned} \quad (6)$$

(assuming that $\theta(t)$ is independent of past observations and past states, given the present state)

$$= \sum_{j=1}^{m} p(\theta(t)|\Omega(t) = \omega_i)p(\Omega(t) = \omega_i|\omega(t - T) = \omega_j) \alpha_j(t - T)$$

-continued (assuming that $\Omega(t)$ is independent of past observations given the past state $\Omega(t-T)$)

$$= p(\theta(t)|\Omega(t) = \omega_i) \sum_{j=1}^{m} \alpha_{ij}\alpha_j(t-T)$$

The first term can be derived from the classifier's estimate of $p(\Omega(t)=w_i|\theta(t))$ and Bayes' rule. This estimate provided by the classifier is referred to as the instantaneous probability. (Alternatively, a classifier could be employed which has been trained to provide instantaneous estimates of the first term itself, namely an estimate of the probability for each state of having made the actual observations, thus obviating the need to invoke Bayes' rule.) The terms in the sum are just a linear combination of the $\alpha$'s from the previous time-step. Hence, Equation 6 gives the basic recursive relationship for estimating state probabilities at any time t.

From Equation (6), a more practical recursive estimate is derived as follows: First, the term $p(\theta(t)|\Omega(t)=w_i)$ is replaced by $p(\Omega(t)=w_i|\theta(t))/p(\Omega(t)=w_i)$ (where the denominator is the prior probability of state i and is estimated prior to operation in the standard manner). Second, the $a_j(t-T)$ terms are each replaced by $p(\Omega(t-T)=w_j|\Phi_{t-T})$. These two substitutions together are equivalent to dividing both sides of Equation 6 by $p(\Phi_t)$ and give the equivalent recursive relation:

$$p(\Omega = \omega_i|\Phi_t) = \frac{p(\Omega(t) = \omega_i|\theta(t))}{p(\Omega(t) = \omega_i)} \sum_{j=1}^{m} \alpha_{ij} p(\Omega(t-T) = \omega_j|\Phi_{t-T})$$

The additional assumptions made in the derivation of Equation 6 (besides the first-order Markov assumption on state dependence) require some comment. The first assumption is that $\theta(t)$ is independent of both the most recent state and the observed past data, given that the present state is known. This implies that the observed symptoms are statistically independent from one time window to the next, given the state information. For disjoint, nonoverlapping, blocks of data this will generally be true if the feature sampling rate $1/\tau$ is greater than any significant frequency components in the underlying observed time-series $\gamma(t)$. For overlapping blocks of data, or where T is comparable to the time constants of the dynamic system, observed symptoms would no longer be independent and the model would be modified to include a measure of this dependence. The second assumption, that the present state only depends on the previous state but not the past observations, seems quite reasonable: there is no reason to expect that states in the future depend on the actual observed data values in the past.

Note that the state probabilities are calculated here based on past information. Alternative estimation strategies are possible. For example, using the well-known forward-backward recurrence relations (Rabiner12) one can update the state probability estimates using symptom information which occurred later in time, i.e., estimate $p(\Omega(t)=w_i|\theta(t+kT), \ldots, \theta(t), \ldots, \theta(0))$. From an operational standpoint this allows further smoothing of glitches and a consequent reduction in false alarms—the disadvantage is that there is a latency of time kT before such an estimate can be made. Another approach is to use the Viterbi algorithm to estimate the most likely joint sequence of states, i.e., $$\max\{p(\Omega(t)=w_i, \ldots, \Omega(0)=w_j|\Phi_t)\}.$$

Which scheme is used depends largely on the particular application and each can easily be implemented using a variation of the recursive equations derived above. The probability estimation method based only on past and present measurements (as described in Equations 5 and 6) is the most direct method for on-line monitoring and will be assumed throughout the rest of the specification.

The Nature of the Markov transition matrix

In the previous sections herein, the existence of the transition matrix A has been assumed. The question naturally arises in practice as to how the entries in this matrix are obtained. For speech recognition applications there is typically an abundance of training data from which A can be estimated by the use of iterative maximum likelihood procedures such as the Bantu-Welch algorithm. However, for reliability monitoring, while there may be data obtained under specific normal and fault conditions, there will typically not be a set of training data corresponding to a sequence of state transitions. Hence, in practice, prior knowledge regarding the overall system reliability and behavior must be brought to bear in order to provide estimates of A. The invention adopts a divide-and-conquer approach by dividing the states into 3 categories: first is the normal state, then the intermittent states, and finally the "hard-fault" states. The difference between the latter two is that intermittent failures allow the possibility of returning to the normal state whereas the "hard-fault" states do not.

Specification of the "normal-normal" transition probability $a_{11}$

The use of a first-order Markov model to describe failure processes implicitly assumes that the lengths of times between failures are distributed geometrically. This follows from the fact that for a discrete-time Markov model the probability that the system stays in state i for n time steps is $p^{n-1}(1-p)$ where $p=a_{11}$. The memoryless assumption which leads to the geometric distribution of inter-failure durations is quite robust and plausible for many applications and is widely used in reliability analysis to model failure processes (Siewiorek and Swarz [13]).

By relating the Markov transition parameters to overall failure statistics of the system, the invention can both check the validity of the geometric distribution assumption and also determine the transition probabilities themselves. The expected length l of time spent in state $w_1$, given that it starts in state $w_1$, is $$E[l] = \sum_{n=1}^{\infty} n \alpha_{11}^{n-1}(1-\alpha_{11}) \tag{7}$$

$$= \frac{1}{1-\alpha_{11}} \tag{8}$$

$$\tag{9}$$

in units of time T. Thus, the mean time between failure (MTBF) of the system can be expressed as $$\frac{MTBF}{T} = \frac{1}{1-\alpha_{11}} \tag{10}$$

and, hence, $$\alpha_{11} = 1 - \frac{T}{MTBF} \quad (11)$$

where the MTBF and T are expressed in the same time units. In this manner, MTBF statistics can be used as the basis for estimating $a_{11}$. The MTBF of the system can typically be either specified by a reliability analysis (for a new system) or can be estimated from a problem database (for a system which has been in use for some time). Note that T will be chosen to be much smaller than the MTBF in practice.

Specification of the fault transition probabilities

Transition probabilities into both intermittent and hard faults from the normal state are found by weighting $1-a_{11}$ (the probability of the system centering a fault state at the next time step given that it is currently in the normal state) by the anticipated relative likelihood of occurrence of each fault state. These relative likelihoods may be derived from reliability analyses or can be estimated empirically if a problem database exists.

The mean anticipated duration of intermittent failures can be used to calculate the self-transition probability for intermittent states in an analogous manner to the way in which the MTBF was used above to find $a_{11}$. Knowledge of intermittent fault duration is typically more subjective in nature than finding the MTBF and may require knowledge of the physics of the fault condition.

Conceptually, hard faults present a problem (in the context of Markov monitoring) since once such a fault occurs the system can not return to the normal state until the fault is physically repaired, which in turn typically requires downtime of the system. In practice, a sensible approach is to define an "absorbing" state which indicates that the system has been halted. Hence, the only allowable transition out of a hard fault state is into the halt state. The length of time which the system may spend in the hard fault state, before the halt state is arrived at, is largely a function of the operational environment: if the Markov monitoring system itself is being used as part of an overall alarm system, or if the fault is detectable by other means, then an operator may shut down operations quickly. On the other hand, if the fault does not manifest itself in any significant observable manner and if the Markov monitoring system is being used only for off-line data analysis, then the system may remain in the hard fault state for a lengthy period of time. Hence, deciding how the self-transition probabilities are chosen for the hard-fault classes will be quite specific to particular operational environments.

To complete the Markov transition matrix it is sufficient to note that "fault-to-fault" transitions are normally disallowed except in cases where there is sufficient prior knowledge to believe that intermittent faults can occur directly in sequence.

Comments on Robustness and Dynamics

The process of defining the Markov transition matrix is obviously quite subjective in nature. While this could be viewed as a weakness of the overall methodology, one can argue that in fact it is a strength. In particular, it allows the effective coupling of relatively high-level prior knowledge (in the form of the Markov transition matrix A) with the "lower-lever" data-driven estimation of $p(\Omega|\theta)$. Naturally, the latitude in specification of A leads to questions regarding the sensitivity of the method to misspecification. While a systematic sensitivity study is beyond the scope of this specification, empirical results using this method suggest that unless the parameter-state conditional densities are almost entirely overlapped, then the model is quite robust to variations in A—typically, only the length of time to switch between states ("time to detect") is directly affected.

For a typically reliable system the dynamics of the Markov model will be such that it will remain in the normal state for long stretches of time. It is important to realize that the relatively static behavior of the model should not undermine the reader's assessment of its practical utility: for many problems it is often extremely difficult to design detectors of rare events which have both a low false alarm rate and a high detection rate. For example, in the next section an application is described in which the system makes classification decisions every 6 seconds or so, while the MTBF is on the order of a few days. For this application, if the Markov model component of the method is omitted and only the instantaneous state estimates arc used, tile false alarm rate increases dramatically to the extent that this non-Markov method would be completely impractical for use in an operational environment.

ALTERNATIVE EMBODIMENT OF THE INVENTION

The problem of interest is that of detecting faults or changes in the observed characteristics of time series data which is being monitored on-line from a dynamic system. Problems which fall into this category include fault, detection in large complex hardware systems (such as nuclear power plants, chemical process plants, large antenna systems) and biomedical monitoring of critical signals in humans (such as pacemakers and so forth). If there exists instantaneous good models of (1) the system which is being monitored, (2) any noise which might be present in the measurement process and (3) the likely behavior of the system when a fault occurs, then standard model-based techniques exist which can accurately detect changes.

In practice however, particularly for large complex systems, there is often little prior knowledge available in the form of accurate models, rendering the model-based method ineffective. Hence, it is common in commercial products to use much simpler threshold alarm methods which trigger an alarm whenever a derived parameter of interest (from the observed time series), or the amplitude of the time series itself, exceeds some pro-specified limit. The problem with this approach is that it is likely to be very sensitive to false alarms if noise is present and will not detect subtle changes in the characteristics of the signal under observation.

The method described above to address the on-line fault detection problem uses a Hidden Markov model. The method is extremely robust to false alarms, does not require a model of the system under normal or fault, conditions, and can detect subtle changes in signal characteristics. The method makes the following assumptions:

A1: There is a known set of m−1 mutually exclusive and exhaustive faults, denoted as $w_2, \ldots, w_{m-1}$, where $w_1$ denotes normal conditions.

A2: Training data for both normal and fault conditions are available which consists of time series sequences.

A3: The observed time series data is stationary under both normal and fault. conditions.

A4: Information about the mean time to failure for each fault mode is available.

However, this method suffers from the significant disadvantage of assumptions A1 and A2, namely that training data is required for a prespecified set of faults. While data is usually easy to acquire for normal conditions, it is often impractical to obtain data under fault conditions.

In the alternative embodiment of the invention, assumptions A1 and A2 can be replaced by a much less restrictive pair of assumptions while still retaining the overall advantages of the invention. The new assumptions are as follows:

A1*: Training data. under normal conditions is available,

A2*: Physical limits can be placed on any parameters of interest which can be derived from the time series.

Assumption A1* is trivial since it is difficult to imagine an application where data under normal conditions cannot be obtained. Assumption A2* essentially states that there must exist sufficient prior knowledge about the observed parameters such that a density function can be specified instantaneous on these parameters. The role of this density function will now be explained.

The parameters of interest at time t are denoted as a vector θ(t). The parameters are typically statistical estimates of some characteristic of the time series such as the mean, variance, or autoregressive (AR) coefficients. As discussed above, it is by observing changes in these derived parameters that, the HMM method detects changes in the underlying time series (and, hence, the system itself). The invention, as described above, requires probability estimates of the form $\hat{p}(\theta(t)|w_i(t))$, $1 \leq i \leq m$, as a central part of the model. These in turn are obtained by Bayes rule from the estimates $\hat{p}(w_i(t)|\theta(t))$ which are learned from the training data. Since the process is assumed to be stationary given w, the reference to time t can be dropped at this point.

In the alternative embodiment, tile changes are as follows:

1. For $w_1$ (normal conditions) calculate $\hat{p}(w_1|\theta)$ using either a parametric density or a non-parametric density estimate where the density is fitted to the available training data.

2. For $w_2$ (non-normal conditions), specify a prior density in the form of $p_{prior}(\theta|w_2)$ where $w_2$ signifies non-normal conditions.

The first change is quite straightforward and merely requires that a multi-variate density be fitted to the observed parameters— standard techniques are available for this purpose. Alternatively, if there is prior knowledge available (e.g., such that the parameters obey a multi-variate Gaussian assumption under normal conditions), this can also be used to specify the density directly. The second change requires that $p_{prior}(\theta|w_2)$ be available. If assumption A2* holds, and in the absence of any other specific information is about the parameter behavior under fault conditions, one can specify a uniform density for $p_{prior}(\theta|w_2)$ where the ranges correspond to the physical limits on the parameters specified in A2*. In practice these limits are usually available. For example, the variance of the signal can be bounded based on the overall energy available to the system—similarly, AR coefficients must obey certain constraints if the underlying process is stationary. The choice of the uniform density is the most appropriate when there is no prior knowledge about the parameters (other than the ranges)—if prior knowledge is available, other prior densities could be used.

Implementation of the Alternative Embodiment: The exact changes required to implement the new method are now described:

1. Set up a 2-state hidden Markov model in accordance with the foregoing description where $w_1$ corresponds to normal conditions and $w_2$ is non-normal.

2. Obtain the transition probabilities for the Markov portion of the model from fault duration data as described above.

3. Determine the functional form of $\hat{p}(w_1|\theta)$ using methods described above.

For each parameter $\theta_j$, $1 \leq j \leq P$ (where P is the number of parameters), specify upper and lower bounds, $a_j$ and $b_j$ respectively, on the possible values which $\theta_j$ can take.

5. Specify the density $p_{prior}(\theta|w_2)$ as $$p_{prior}(\theta|\omega_2) = \prod_{j=1}^{J} \frac{1}{b_j - \alpha_j}$$

if there is no prior knowledge available other than the range of parameter values and the density under normal conditions ($\hat{p}(w_1|\theta)$). If prior knowledge is available then use this information to specify $p_{prior}(\theta|w_2)$.

6. Perform the process of the invention as described above, except that in equation (6) the $p(\theta(t)|w_i(t))$ term is now calculated as described in steps 3 and 5 above.

There are several possible extensions to the alternative embodiment, including the use of on-line adaptation to improve the initial models and the incorporation of specific fault models in the case where such prior knowledge of fault behavior is available. These extensions are technically relatively straightforward given the underlying method as described here.

The alternative embodiment requires fewer assumptions than the foregoing main embodiment while still retaining many of the advantages of the main embodiment. Implementation is quite simple and has a very low computational complexity (order of P.m calculations per time step). In addition, in the alternative embodiment, setting up the model simply requires the specification of some ranges on the parameters of interest and some normal training data—hence, the method should be relatively robust and could conceivably be used as part of an "off-the-shelf" product by non-specialists. Given the simplicity and reliability of the method, it, would appear that it may have considerable practical utility for a wide variety of on-line monitoring applications.

In the remainder of this specification, the description concerns the main embodiment of tile invention.

Background on Antenna Fault Diagnosis

Application of the hidden Markov model to a real fault monitoring problem is now described. It is first helpful to provide some background. The Deep Space Network (DSN) (designed and operated by the Jet Propulsion Laboratory for the National Aeronautics and Space Administration (NASA)) provides end-to-end telecommunication capabilities between earth and various interplanetary spacecraft throughout the solar system. The ground component of the DSN consists of three ground station complexes located in California, Spain and Australia, giving full 24-hour coverage for deep space communications. Since spacecraft are always severely limited in terms of available transmitter power (for example, each of the Voyager spacecraft only use 20 watts to transmit signals back to earth), all subsystems of the end-to-end communications link (radio telemetry, coding, receivers, amplifiers) tend to be pushed to the absolute limits of performance. The large steerable ground antennas (70 m and 34 m dishes) represent critical potential single points of failure in the network. In particular there is only a single 70 m antenna at each complex because of the large cost and calibration effort involved in constructing and operating a steerable antenna of that size—the entire structure (including pedestal support) weighs over 8,000 tons.

The antenna pointing systems consist of azimuth and elevation axes drives which respond to computer-generated trajectory commands to steer the antenna in real-time. Pointing accuracy requirements for the antenna are such that there is little tolerance for component degradation. Achieving the necessary degree of positional accuracy is rendered difficult by various non-linearities in the gear and motor elements and environmental disturbances such as gusts of wind affecting the antenna dish structure. Off-beam pointing can result in rapid fall-off in signal-to-noise ratios and consequent potential loss of irrecoverable scientific data from the spacecraft.

Figure 2A:
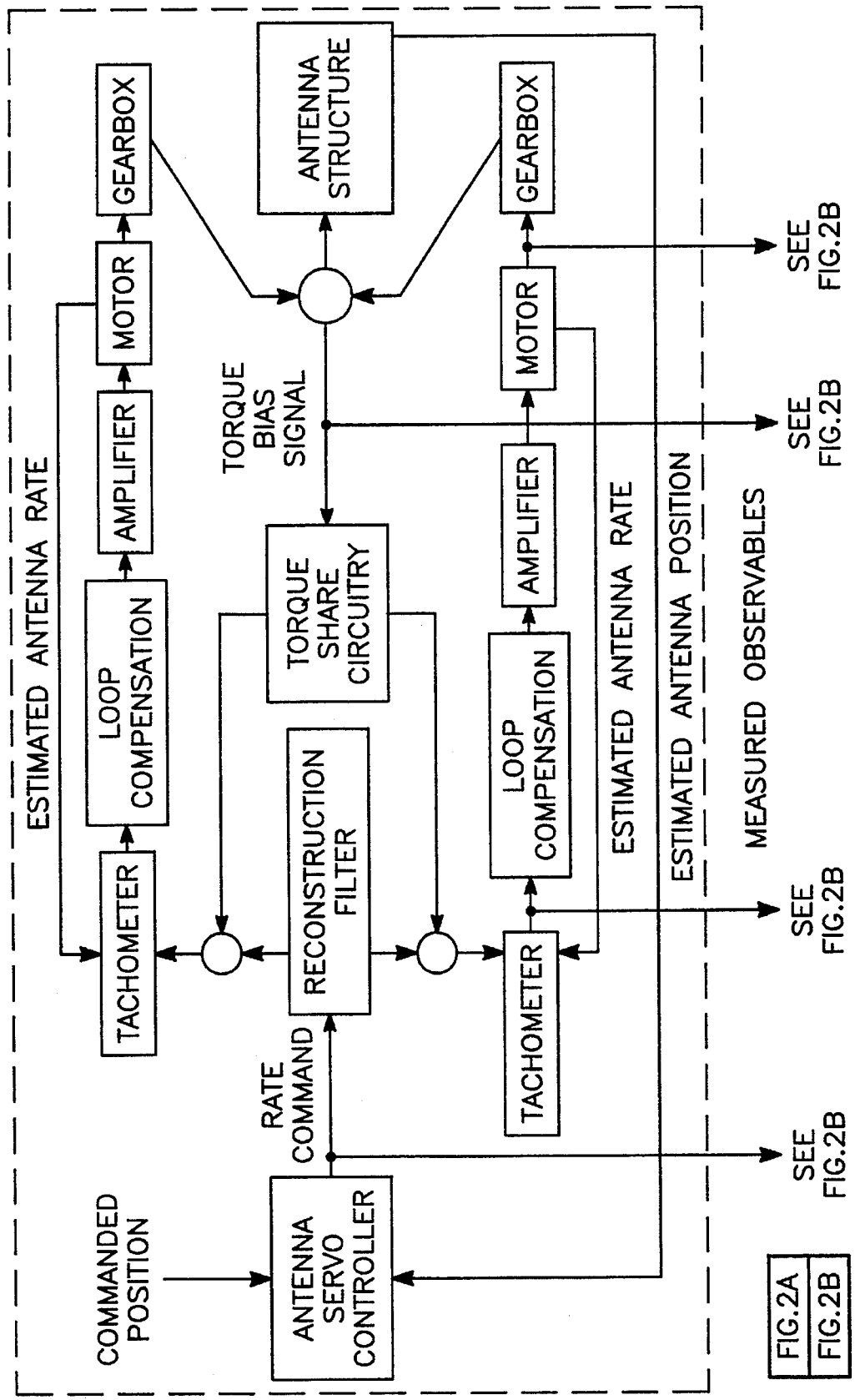

The antenna servo pointing systems are a complex mix of electromechanical components. FIG. 2A includes a simple block diagram of the elevation pointing system for a 34 m antenna—see Appendix 2 for a brief description of how the pointing system works. A faulty component manifests itself indirectly via a change in the characteristics of observed sensor readings in the pointing control loop. Because of the non-linearity and feedback present, direct causal relationships between fault conditions and observed symptoms can be difficult to establish—this makes manual fault diagnosis a slow and expensive process. In addition, if a pointing problem occurs while a spacecraft. is being tracked, the antenna is often shut-down to prevent any potential damage to the structure and the track is transferred to another antenna if possible. Hence, at present, diagnosis often occurs after the fact, where the original fault conditions may be difficult to replicate.

Experimental Results

Data Collection and Feature Extraction

The observable antenna data consists of various sensor readings (in the form of sampled time series) which can be monitored while the antenna is in tracking mode. To generate a fault library hardware faults were introduced in a controlled manner by switching faulty components in and out of the control loop. Sensor variables monitored included wind speed, motor currents, tachometer voltages, estimated antenna position, and so forth.

The time series data was initially sampled at 50 Hz (well above the estimated Nyquist sampling rate for signals of interest) and segmented into windows of 4 seconds duration (200 samples) to allow reasonably accurate estimates of tile various features. The features are derived by applying an autoregressive-exogenous (ARX) modelling technique using the rate feedback commands as the input to the model and motor current as output, using the definitions illustrated in FIG. 1:

$$y(t) + \sum_{i=1}^{p} a_i y(t-i) = \sum_{j=1}^{q} b_j u(t-j) + e(t), \quad (12)$$
$$t = 1, 2, \ldots, N$$

where y(t) is the motor current, u(t) is tile rate command input, e(t) is an additive white noise process, and $a_i$ and $b_j$ are the model coefficients. The model order was chosen by finding an empirical minimum (using data from normal conditions) of the Akaike Information Criterion (AIC) which trades-off goodness-of- fit to the data with model complexity (Ljung [14]). An 8th order model was chosen in this manner with p=6 and q=2, resulting in 8 ARX features. Using this model structure, a separate set of ARX coefficients was estimated from each successive 4-second window of data using direct least mean squares estimation. Hence a new set of features, θ(t), is available at a rate of 0.25 Hz compared to the original sampling rate of 50 Hz—for this particular application this rate of decision-making is more than adequate. The autoregressive representation is particularly useful for discriminative purposes when dealing with time series (Kashyap [15]).

In addition to the ARX features, there are four time domain features (such as the estimated standard deviations of tachometers and torque sensors) which were judged to have useful discriminative power. It is worth pointing out that for the chosen sample size of 200 it was found that the assumption that feature estimates do not have any temporal dependence across windows was justified. This observation is based on empirical results obtained by analyzing the correlation structure in the training data.

Model Development

Data was collected at a 34 meter antenna site in Goldstone, Calif. in early 1991, under both normal and fault conditions. The two faults corresponded to a failed tachometer in the servo loop and a short circuit in the electronic compensation loop—these are two of the most problematic components in terms of reliability. The data consisted of 15000 labelled sample vectors for each fault, which was converted to 75 feature vectors per class. Data was collected on two separate occasions in this manner. Because the antenna is in a remote location and is not permanently instrumented for servo component data acquisition, data collection in this manner is a time-consuming and expensive task. Hence, the models were trained with relatively few data points per class.

Experiments were carried out with both a feedforward multilayer neural network and a simple maximum-likelihood Gaussian classifier. A general description of the neural network model used is given in the Appendix. The neural network was chosen over alternative classification models because of its ability to approximate arbitrary decision boundaries in a relatively non-parametric manner. In addition, by using a mean-square error objective function, the outputs of the network can be used as estimates of posterior class probabilities (Richard and Lippmann [15] and Miller, Goodman and Smyth [16]). Based on cross-validation results, a network with a single hidden layer of 12 units was chosen as the working model. The networks were trained using a conjugate gradient variation of the well known backpropagation method (Barnard and Cole [18], Powell [19]). The Gaussian classifier used a separate, diagonal covariance matrix for each class, where the components consisted of maximum likelihood estimates. Using the full covariance matrix was considered impractical given only 150 samples per class in 12 dimensions. Components of the Markov transition matrix A were estimated using a database of trouble reports which are routinely collected at all antenna sites—see Appendix 3 for a more detailed discussion.

FIGS. 2A and 2B illustrate a system embodying the present is invention monitoring an antenna pointing system, including the pointing system followed by the parameter estimation stage, which is followed below by the parameter/state conditional probability model. Finally, the conditional probability model is followed by the Markov component, showing both past state estimates and current instantaneous estimates being combined as in Equation (6). These models were implemented in software as part of the data acquisition system. The results of testing the models on previously unseen data in real-time at the antenna site are discussed in the next section.

Referring now to FIGS. 2A and 2B, the measured observables from the system being monitored (such as the rate commands, tachometer readings and torque bias of the antenna pointing system) are received by an on-line parameter estimator 10 of a parameter estimation model 20. The parameter estimation model 20 compares a predicted observable (such as the motor output of the antenna pointing system) predicted by the parameter estimator 10 with the actual measurement of that observable (such as the actual measured motor output of the antenna pointing system) to form an error signal, which is fed back to the parameter estimator 10. From this, the parameter estimator 10 provides estimated parameters during each successive sampling interval. The estimated parameters may be, for example, statistical quantities which reflect the amount of change in each observable. These estimated parameters are then processed in a conventional classifier 30 such as a neural network providing a mapping between symptoms (the estimated parameters) and classes (including the normal condition state and various types of fault states). The classifier 30 provides instantaneous probability estimates of the states of the system based upon the estimated parameters. These instantaneous probability estimates are first transformed to instantaneous probabilities. The instantaneous probabilities are then processed by a Markov time correlation model 40 embodying the computation of Equation 6. Specifically, at each successive sampling interval, the Markov model 40 performs the hidden Markov model calculation of Equations 5 and 6 to produce the posterior state probabilities of the system states, and infers the true system state from the one posterior state probability dominating the others. This inference of the true system state is the system decision at time t (the current sampling interval). Thus, a sequence of hidden Markov model calculations 50, 60, 70, and so forth are performed. As indicated in FIG. 2, the results of each calculation 50, 60, 70, and so forth are saved and used in the next calculation performed during the next sampling interval. Thus, the calculation 60 performed during the current sampling interval at time t uses the results of the calculation 50 performed during the previous sampling interval at time t−1. Moreover, the results of the current calculation 60 are used by the next calculation 70 performed at time t+1.

Each calculation 50, 60, 70, and so forth uses Equation 6 to compute the intermediate probability of Equation 4 and then employs the rule of Equation 5 to compute the posterior system probabilities. The intermediate probability is equal to the corresponding instantaneous probability of the one state multiplied by a sum over plural states of the intermediate probability for a given state computed during the previous sampling interval multiplied by the transition probability between the given state and the one state. Finally, the method is completed by computing from the intermediate probability for each one of the states of the current sampling interval the posterior probability that the system is in the corresponding one of the states, and determining from the posterior probabilities whether the system has transitioned to one of the failure states and, if the system has transitioned to one of the failure states, issuing an alarm corresponding thereto.

Defining plural transition probabilities includes observing a mean time between failures (MTBF) characteristic of each of the failure states and computing each corresponding transition probability therefrom. Computing the corresponding transition probability includes dividing the time period of the sampling intervals by the MTBF and subtracting the resulting quotient from unity.

Transforming the instantaneous probabilities to the instantaneous probabilities is accomplished using Bayes' rule.

Classification Results

The neural and Gaussian models, both with and without the Markov component, were tested by monitoring the antenna as it moved at typical deep-space tracking rates of about 4 mdeg/second. The results reported below consist of summary results over a variety of different short tests: the cumulative monitoring time was about 1 hour in duration.

TABLE 1

Percentage misclassifation rates for Gaussian and neural models both with and without Markov component.

| Class | Without Markov model | | With Markov model | |
|---|---|---|---|---|
| | Gaussian | Neural | Gaussian | Neural |
| Normal Conditions | 0.36 | 1.72 | 0.36 | 0.00 |
| Tachometer Failure | 27.78 | 0.00 | 2.38 | 0.00 |
| Compensation Loss | 34.21 | 0.00 | 43.16 | 0.00 |
| All Classes | 16.92 | 0.84 | 14.42 | 0.00 |

Table 1 summarizes the overall classification performance for each of the models, and both for each individual class and for all classes averaged together. Clearly, from the final column, the neural-Markov model is the best model in the sense that no windows at all were misclassified. It is significantly better than the Gaussian classifier which performed particularly poorly under fault conditions. However, under normal conditions it was quite accurate having only 1 false alarm during the roughly 30 minutes of time devoted to monitoring normal conditions—this is not too surprising since in theory at least the ARX coefficients should obey a multivariate Gaussian distribution given that the model is correct, i.e., for the non-fault case (Ljung14). The effect of the Markov model is clearly seen to have beneficial effects, in particular reducing the effects of isolated random errors. However, for the compensation loss fault, the Markov model actually worsened the already poor Gaussian model results, which is to be expected if the non-Markov component is doing particularly poorly as in this case.

TABLE 2

Logarithm of Mean Squared Error for Gaussian neural models both with and without Markov component.

| Class | Without Markov model | | With Markov model | |
|---|---|---|---|---|
| | Gaussian | Neural | Gaussian | Neural |
| Normal Conditions | −2.44 | −1.97 | −2.46 | −4.24 |
| Tachometer Failure | −0.40 | −3.52 | −0.42 | −4.22 |
| Compensation Loss | −0.2 | −3.48 | −1.39 | −4.71 |
| All Classes | −0.87 | −2.29 | −1.02 | −4.34 |

Table 2 presents the same data summarized in terms of the logarithm (base 10) of the mean-square error (MSE), calculated as follows:

$$MSE = \frac{1}{N} \sum_{j=1}^{N} \sum_{i=1}^{m} (p(\omega_i(j)) - o_i(j))^2 \quad (13)$$

where $\hat{p}(w_i(j))$ is the classifier's estimate of the posterior probability of class i for input, j, $o_i(j)=1$ if $w_i$ is the true class for input j and zero otherwise, and N is the size of the training data set. The mean-square error provides more information on the probabilities being produced by the classifier than the classification error rates. Lower values imply that the probabilities are sharper, i.e., the classifier is more certain in its conclusion. The general trend in Table 2 is that the neural-Markov combination is significantly better than any of the other combinations.

Figure 3:
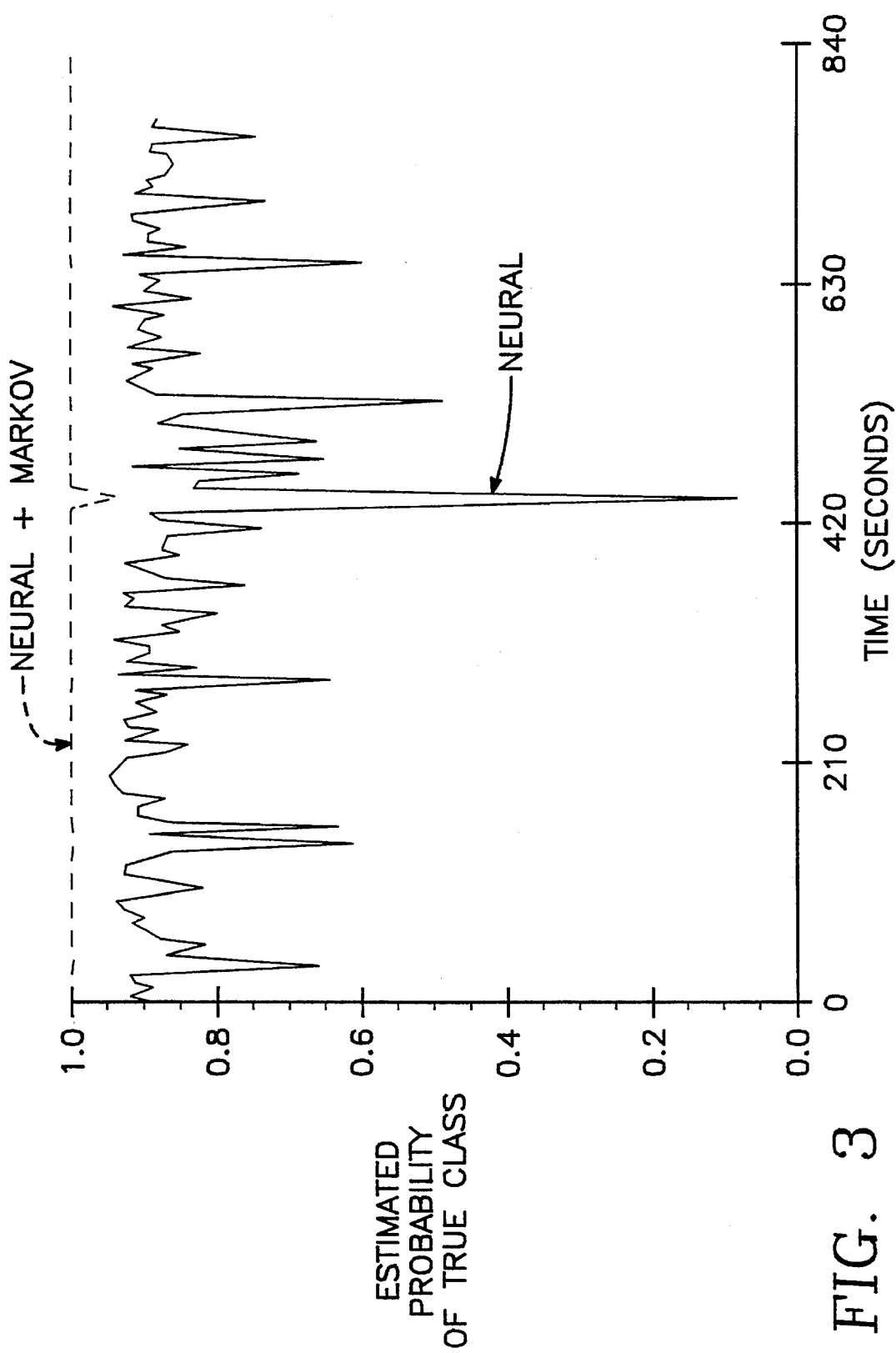
FIG. 3 is a graph comparing estimates of probability of the true class for normal conditions as a function of time obtained from the neural-Markov embodiment of the invention and obtained with a prior art neural network.
Figure 4:
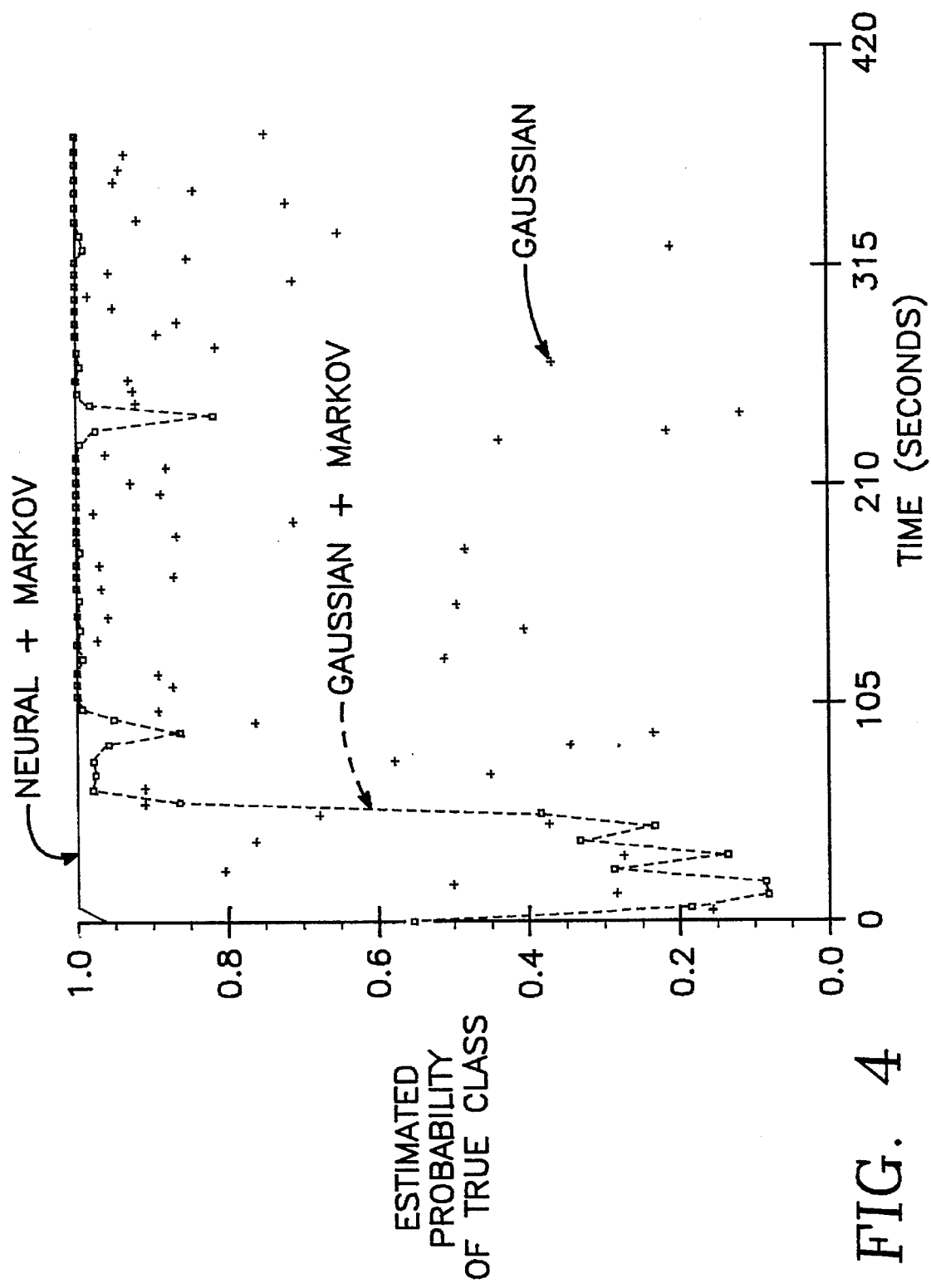
FIG. 4 is a graph of estimates of probability of the true class corresponding to a compensation loss in the antenna pointing system as a function of time obtained from the neural-Markov embodiment of the invention and obtained with a Gaussian-Markov embodiment of the invention.
Figure 5A:
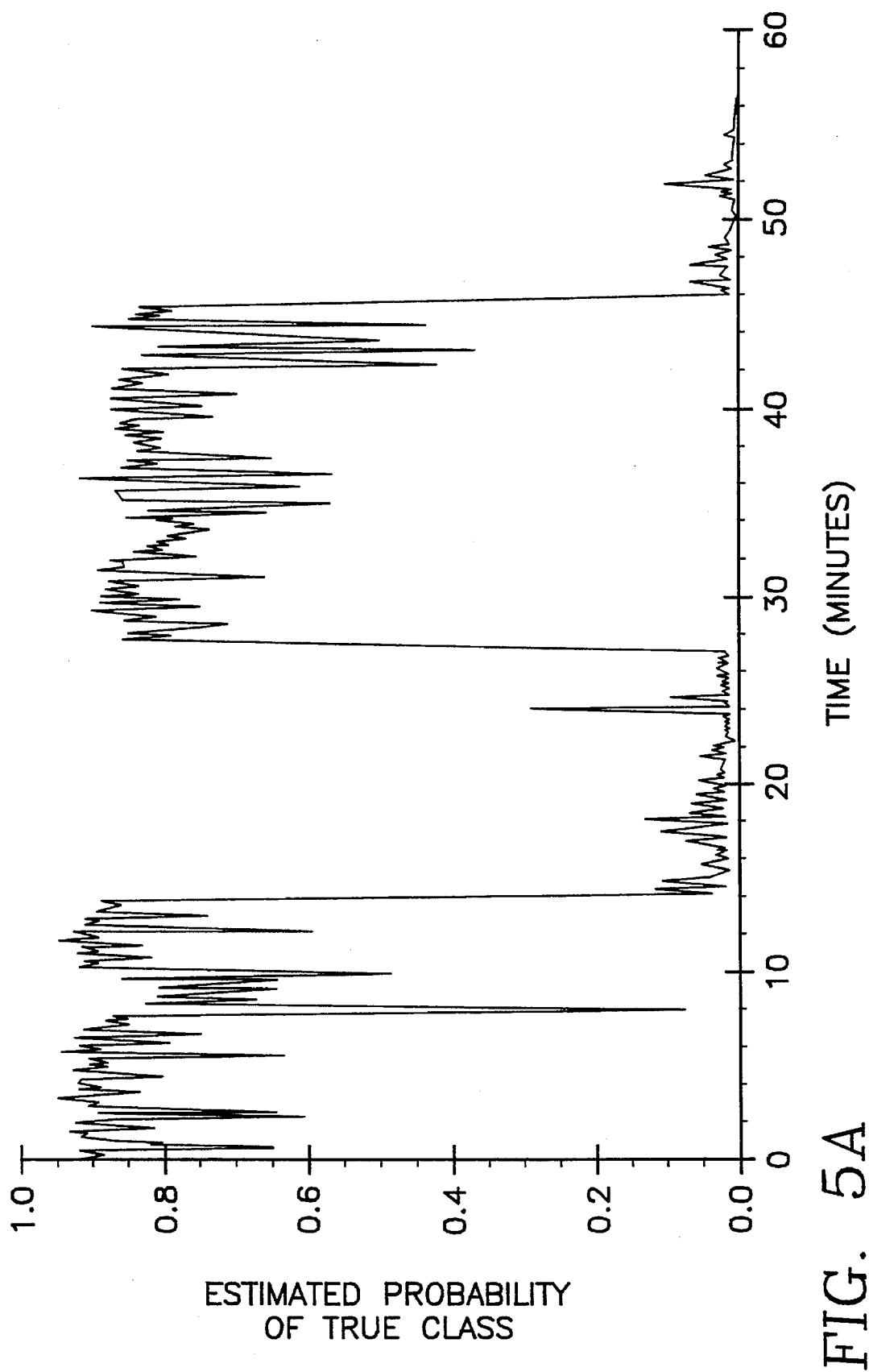
FIGS. 5A, 5B and 5C are graphs of three separate contemporaneous plots aligned vertically along the time axis of estimated probabilities of three respective classes or states (corresponding to the normal state, a tachometer fault and a compensation loss fault, respectively) obtained simultaneously with a prior art neural network, over a time interval during which the system is in the three corresponding states one-at-a-time in succession.
Figure 5B:
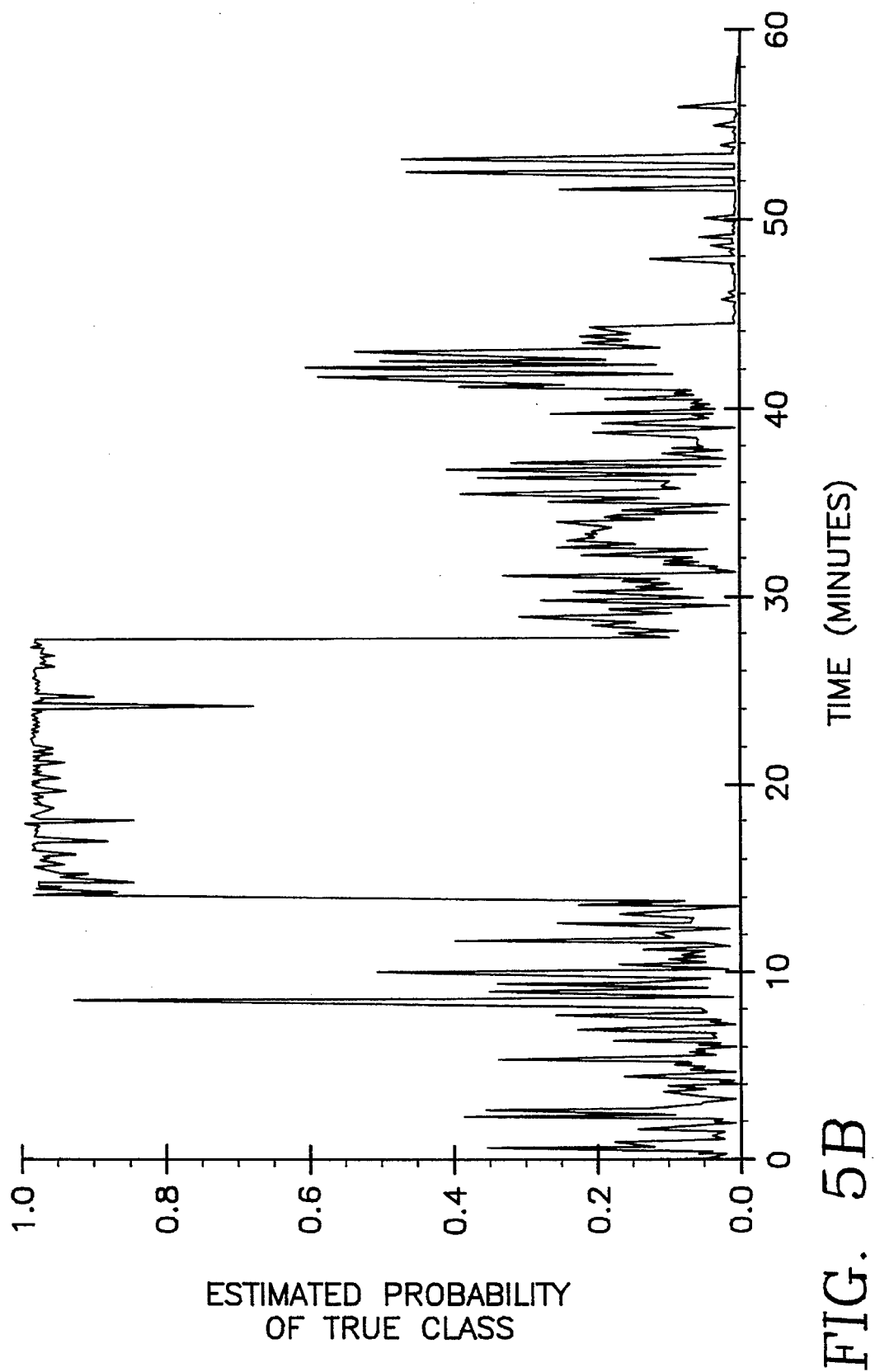
Figure 5C:
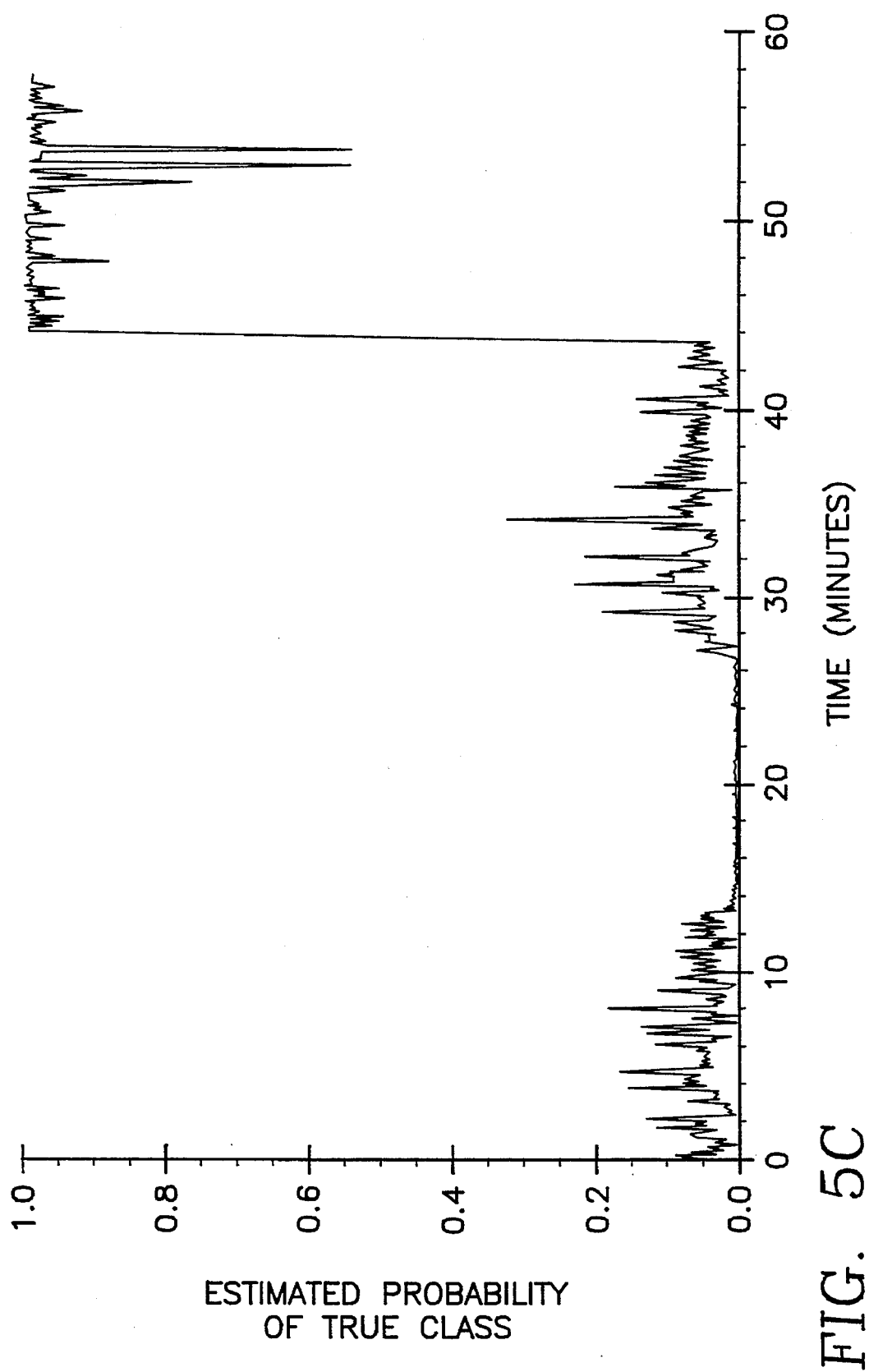
Figure 6A:
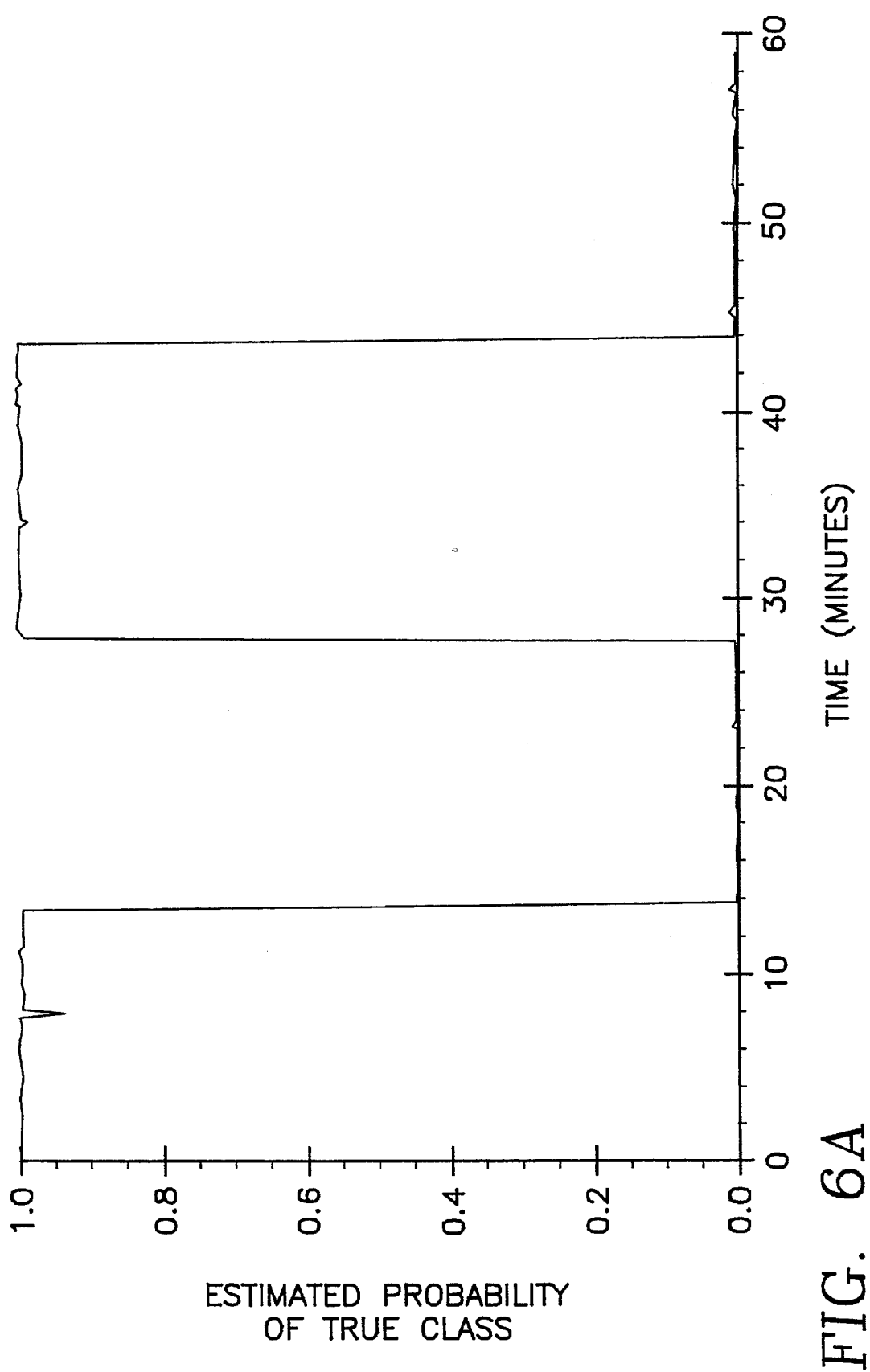
FIGS. 6A, 6B and 6C are graphs of three separate contemporaneous plots, aligned vertically along the horizontal time axis, of estimated probabilities of the three states of FIG. 5A, respectively, obtained simultaneously with the neural-Markov embodiment of the present invention, over a time interval during which the system is in the three states one-at-a-time in succession.
Figure 6B:
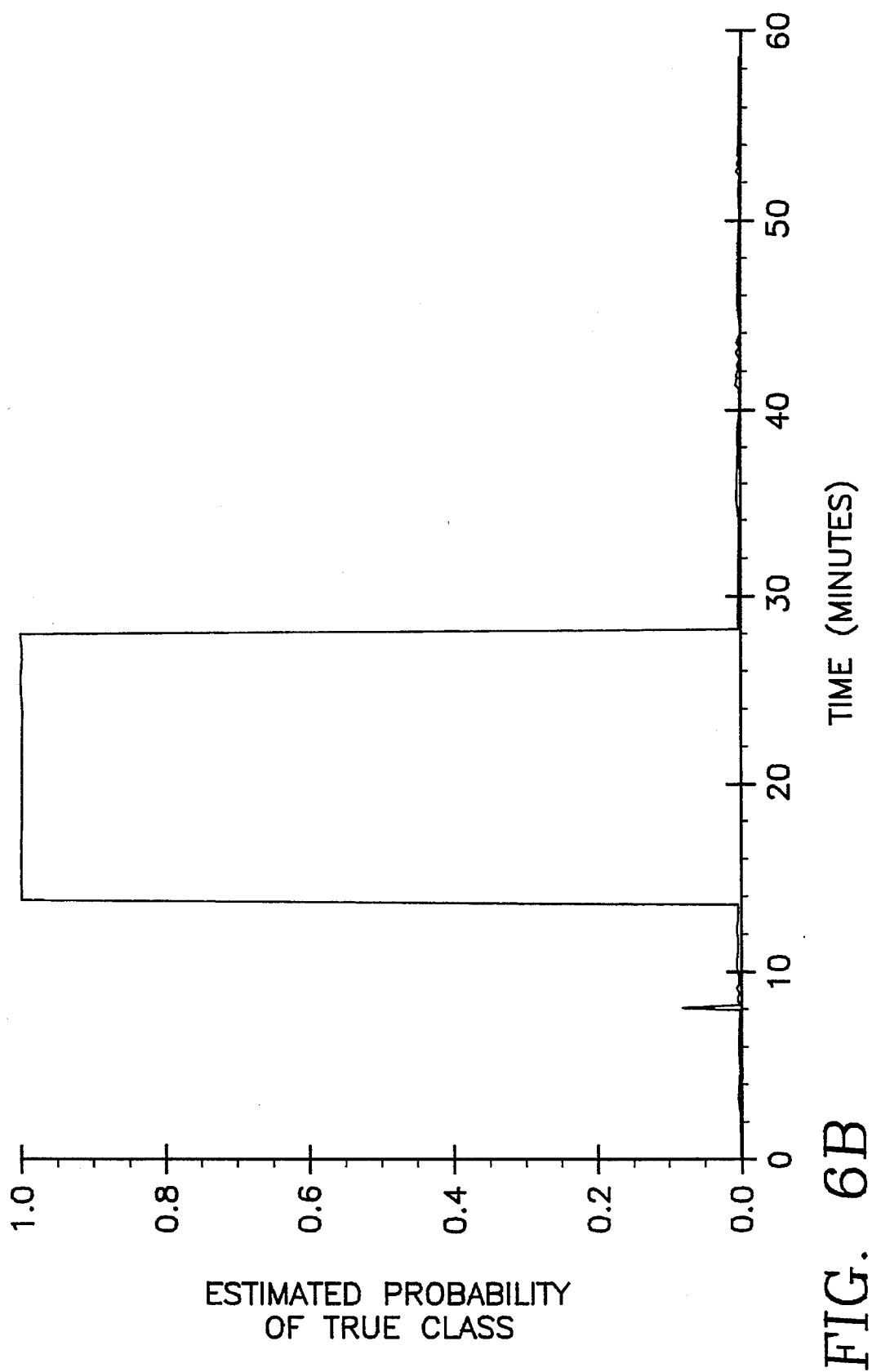
Figure 6C:
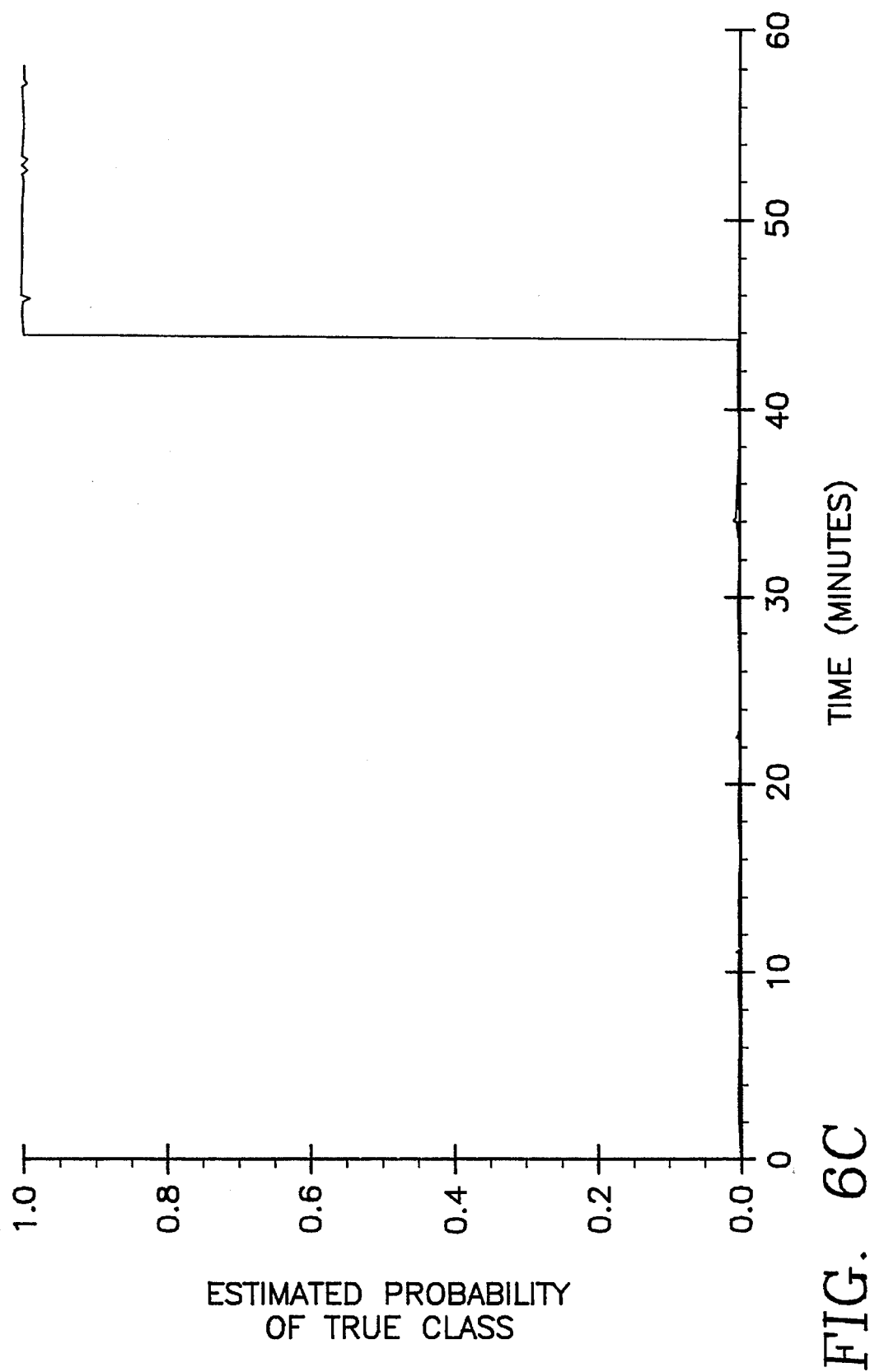

FIGS. 3, 4, and 5 plot the estimated probability of the true class as a function of time for various models to allow a more detailed interpretation of the results. Note that, given that the true class is labelled i, the estimated probability of class i from the neural network corresponds to the normalized output of output unit i of the network at time t, i.e., $$\hat{p}_i(t) = \frac{\hat{o}_i(t)}{\sum_{k=1}^{4} \hat{o}_k(1t)} \quad (14)$$

(where $\hat{o}_i(t)$ is the value of the ith network output node) while the Markov probabilities correspond to the estimates of $p(\Omega(t)=w_i|\Phi(t))$, as described earlier in Equation 6.

FIG. 3 corresponds to normal conditions and compares the neural model with and without the Markov processing. The instantaneous probability estimates from the neural model have a large variation over time and are quite noisy. This is essentially due to the variation in the sensor data from one window to the next, since as might be expected, signals such as motor current contain significant noise. In addition, a large glitch is visible at about 460 seconds. The neural model gives a low probability that the condition is normal for that particular window (in fact a large glitch such as this looks like a tachometer failure problem), however, the Markov model remains relatively unaffected by this single error. Overall, the stability of the Markov model is clearly reflected in this plot and has significant advantages in an operational environment in terms of keeping the false alarm rate to a minimum. Note that at any particular instant the neural network only ever assigns a probability of up to 0.8 or 0.9 to the true class. In contrast, by modelling the temporal context, the neural-Markov model assigns a much greater degree of certainty to the true class.

FIG. 4 compares the performance of the Gaussian, Gaussian-Markov and neural-Markov models on detecting the compensation loss fault. The variation in the Gaussian estimates is quite noticeable. The Gaussian-Markov model combination, after some initial uncertainty for the first 90 or so seconds, settles down to yield reasonable estimates. However, the overall superiority of the neural-Markov model (the upper curve) is evident.

FIGS. 5A through 5C and FIGS. 6A through C show the performance of the neural network classifier without and with the hidden Markov model, respectively, while monitoring the antenna for a total duration of about 1 hour. Tachometer failure and compensation loss fault are introduced into the system after 14 minutes and 44 minutes respectively, each lasting roughly 15 minutes in duration. The difference in the quality of the 2 approaches is clearly visible in the figures and leaves little doubt as to the utility of the Markov method.

The results presented above clearly demonstrate the ability of a hidden Markov model to enhance the overall quality and reliability of a monitoring system's decisions. From a practical standpoint, the difference is significant: the non-Markov systems would not be reliable for actual operational use since they are too noisy and would have an unacceptably large false alarm rate. In contrast, the Markov-based system is a serious candidate for field implementation, particularly for installation in all new antenna designs. However there are significant opportunities for further improvement in models of this nature.

Detecting Novel Classes

While the neural model described above exhibits excellent performance in terms of discrimination, there is another aspect to classifier performance which must be considered for applications of this nature: how will the classifier respond if presented with data from a class which was not included in the training set. Ideally, one would like the model to detect this situation. For fault diagnosis the chance that one will encounter such novel classes under operational conditions is quite high since there is little hope of having an exhaustive library of faults to train on.

In general, with any non-parametric learning algorithm, there can be few guarantees about the extrapolation behavior of the resulting model (Geman, Bienenstock and Doursat [20]). The response of the trained model to a point far away from the training data may be somewhat arbitrary, since it may lie on either side of a decision boundary, the location of which in turn depends on a variety of factors such as initial conditions for the training algorithm, objective function used, particular training data, and so forth. One might hope that for a feedforward multi-layer perception, novel input vectors would lead to low response for all outputs. However, if neural activation units with non-local response functions are used in the model (such as the commonly used sigmoid function), the tendency of training algorithms such as back-propagation is to generate mappings which have a large response for at least one of the classes as the attributes take on values which extend well beyond the range of the training data values. Kramer and Leonard [21] discuss this particular problem of poor extrapolation in the context of fault diagnosis of a chemical process plant. The underlying problem lies in the basic nature of discriminative models which focus on estimating decision boundaries based on the differences between classes. In contrast, if one wants to detect data from novel classes, one must have a generative model for each known class, namely one which specifies how the data is generated for these classes. Hence, in a probabilistic framework, one seeks estimates of the probability density function of the data given a particular class, $f(\theta|\Omega=w_i)$, from which one can in turn use Bayes' rule for prediction:

$$p(\Omega = \omega_i|\theta) = \frac{f(\theta|\Omega = \omega_i)p(\Omega = \omega_i)}{\sum_{k=1}^{m} f(\theta|\Omega = \omega_k)p(\Omega = \omega_k)} \quad (15)$$

Generative models have certain disadvantages: they can perform poorly in high dimensions, and for a fixed amount of data may not be as efficient in terms of approximating the Bayes decision boundary as a purely discriminative method.

Discussion

The hidden Markov method for on-line health monitoring proposed in this specification relies on certain key assumptions which may or may not be true for particular applications. In particular, for the purposes of this discussion it is assumed that:

1. Faults are discrete in nature (i.e., they are "hard" failures rather than gradual degradation) and are known in advance.

2. There is a fault library of classified data (for some embodiments of the present invention) in order to train the model.

3. Symptom estimates are statistically independent from one window to the next, conditioned on the classes.

However, it should be pointed out that these assumptions could potentially be relaxed and the model further refined. For example, a fault library may not be necessary if the symptom-fault dependence can be specified based on prior knowledge. Similarly, the assumption of independence of symptom estimates across windows is not strictly necessary—it makes the model much simpler, but could be included in Equation 6 if such dependence is known to exist and can be modelled.

Conclusion

Effective modelling of temporal context in continuous monitoring applications can considerably improve the reliability and accuracy of a decision system. In particular, it has been shown in this specification that hidden Markov models provide an effective method for incorporating temporal context in conjunction with traditional classification methods. The Markov model approach has the ability to significantly reduce the false alarm rate of a classification system by taking advantage of any time domain redundancy which may be present. The model was demonstrated on a real-world antenna fault diagnosis problem—the empirical results demonstrate clearly the advantage of the Markov approach. In general, the use of hidden Markov models for continuous monitoring seems to have is promise: applications to other critical applications such as medical diagnosis in intensive care situations, nuclear plant monitoring, and so forth, appear worthy of further investigation.

While the invention has been described in detail with reference to preferred embodiments, it is understood that variations and modifications thereof may be made without departing from the true spirit and scope of the invention.

Appendix 1: Neural Network Model Description

The following is a description of an example of a popular feedforward multi-layer neural network model to familiarize the reader with the general notation and concepts. FIG. 7 shows an example of such a neural network. The input nodes are labeled $n_i$, $1 \leq i \leq K+1$, the hidden nodes are labelled $h_j$, $1 \leq j \leq H$, and the output layers are labelled $o_k$, $1 \leq k \leq m$. In general, there are K+1 input units, where If is the number of features. The extra node is always in the "on" state, providing a threshold capability. Similarly, there are m output nodes, where m is the number of classes.

The number of hidden units H in the hidden layer can influence the classifier performance in the following manner: too many and the network overfits the data, whereas too few hidden units leaves the network with insufficient representational power. The appropriate network size is typically chosen by varying the number of hidden units and observing cross-validation performance.

Each input unit i is connected to each hidden unit j by a link with weight $w_{ij}$, and each hidden unit j is connected to each output unit k by a weighted link $w_{jk}$. Each hidden unit calculates a weighted sum and passes the result through a non-linear function F(),i.e., $$\alpha(h_j) = F\left( \sum_{i=1}^{i=K+1} \omega_{ij}\alpha(n_i) \right)$$

where $a(n_i)$ is the activation of input unit i—typically, this is just a linear (scaled) function of the input feature. A commonly used non-linear function in the hidden unit nodes F(x) is the so-called sigmoid function, defined as $$F(x) = \frac{1}{1+e^{-x}}$$

Output unit k calculates a similar weighted sum using the weights $w_{jk}$ between the jth hidden unit and the kth output unit, i.e., $$\alpha_k = G\left( \sum_j \omega_{jk}\alpha(h_j) \right)$$

where $a_k$ is the activation of the kth output node. The function G(x) can be chosen either as linear (e.g. G(x)=x) or as a nonlinear function. For example for a classification problem such as that described in this specification the sigmoid function is used to restrict the range of the output activations to the range [0, 1]. A classification decision is made by choosing the output unit with the largest activation for a given set of inputs (feature values); i.e., choose class k such that $$k = \arg\max_i \{\alpha_i\}$$

The network design problem is then to find the best set of weights such that a particular objective function is minimized on the N training data samples—the training data is in the form of input-output pairs $\{x_j, y_j\}$, $1 \leq j \leq N$ where $x_j$ is a feature vector and $y_j$ is the desired output. (For simplicity of notation assume that there is only a single output model). Let $\hat{y}_j(\Omega, x_j)$ be the network output for a particular set of weights $\Omega$ and input vector $x_j$. The objective function is typically some metric on $y_j$ and $\hat{y}_j$, whose mean value is estimated on the training data. Commonly used such objective functions include the mean-squared error $$E_{MSE} = \frac{1}{N} \sum_{j=1}^{N} (y_j - \hat{y}_j(\Omega, j))^2$$

and the cross-entropy error $$E_{CE} = \frac{1}{N} \sum_{j=1}^{N} y_j \log \frac{y_j}{\hat{y}_j(\Omega, j)} + (1 - y_j)\log \frac{1 - y_j}{1 - \hat{y}_j(\Omega, j)}$$

From a maximum likelihood perspective the mean-squared error approach essentially assumes that the training data is perturbed by additive Gaussian noise, while the cross-entropy function assumes a multinomial distribution on the class labels. Despite these significantly different assumptions, for classification problems there appears to be little practical difference in terms of classification performance between these objective functions. For the experiments reported in this specification the mean-squared error objective function was used.

Appendix 2: Description of the Antenna Pointing System

FIG. 2A includes a block diagram of the elevation axis antenna drive subsystem (there is a corresponding azimuth axis drive for positioning the antenna in time azimuth axis). The elevation drive subsystem is a closed-loop control system that consists of a digital control computer, two 7.5 horsepower direct current motors, two servo amplifiers, two cycloid gear reducers, two tachometers, and various electronic components for signal conditioning and servo compensation. The two forward tachometer/amplifier/motor/gear paths operate in tandem to drive a large bull gear which is attached to the antenna structure (a 34 m dish plus supporting metal structure). Feedback control is provided by both rate feedback from each motor to its tachometer and a position feedback loop. The antenna position is estimated by an optical encoder and fed back to the antenna servo controller. The antenna servo controller is a microprocessor-based system which implements a PI (proportional plus integral) control algorithm by integrating both the commanded position (which is a digital signal sent from a ground station control computer describing the desired position) and the actual position estimate. The digital portion of the control loop (the antenna servo controller) updates at a 50 Hz rate. The reconstruction filter and the loop compensation components are filters for signal conditioning and control loop compensation. Finally, the torque bias signal is a voltage measurement proportional to load torque which is fed back from the gears in order to share the torque between the two motors, reduce the effect of parameter variations between them and to effectively bias the cycloid gears away from non-linear regions of operation.

Appendix 3: Specification of the Markov Transition Matrix for the Antenna Pointing Problem Training and test data under fault conditions were obtained by switching faulty components in and out of the servo control loop. Hence, for the purposes of this experiment, the two fault conditions were modelled as intermittent faults and fault transitions between these two states were allowed. The Markov transition matrix A was set as follows:

$$A = \begin{pmatrix} 0.999 & 0.005 & 0.005 \\ 0.0005 & 0.99 & 0.005 \\ 0.0005 & 0.005 & 0.99 \end{pmatrix}$$

This corresponds to a system MTBF of about 1 hour and 7 minutes given the 4 second decision interval. It also assumes that each fault is equally likely to occur and that the mean duration of each fault is about 6 minutes and 40 seconds. The initial state probabilities were chosen to be equally likely:

$\pi(0)=(\frac{1}{3},\frac{1}{3},\frac{1}{3})$.

The actual MTBF of the system under operational conditions was estimated from a problem database to be about 30 hours if only hard faults are considered. However, if intermittent transient faults are also considered, the MTBF is effectively reduced to about 1 hour—this estimate is based on empirical observations of the antenna in an operational tracking mode. Hence, while the self-transition probabilities of the fault states are set in a somewhat what artificial manner for this experiment, the value chosen for $a_{11}$ correlates well with the effective MTBF of the system.

As mentioned previously herein, the state estimates of the model are relatively robust to changes in the values of the transition probabilities. For example, increasing $1-a_{11}$ by an order of magnitude causes the estimates to be slightly less stable but does not introduce any additional false alarms, while reducing $1-a_{11}$ by an order of magnitude causes no significant difference in the results other than the time for the model to switch from normal to a fault state (after a fault has actually occurred) increases from a single 4-second interval to 2 or 3 such intervals. It should be pointed out that the robustness of the method in general to misspecification errors in the transition matrix is a topic for further investigation.

The geometric distribution was found to be a reasonable fit for the distribution of durations between failures, thus validating the first-order Markov assumption.

Appendix 4: Kernel Density Estimation

Unless one assumes a particular parametric form for $f(x|w_j)$, then it must be somehow estimated from the data. The multi-class nature of the problem is now ignored temporarily in favor of a single-class case. The present description focuses here on the use of kernel-based methods. Consider the 1-dimensional case of estimating the density $f(x)$ given samples $\{x_i\}$, $1 \leq i \leq N$. The idea is simple enough: an estimate $\hat{f}(x)$ is obtained, where x is the point at which the density must be found, by summing the contributions of the kernel $K((x-x_i/h)$ (where h is the bandwidth of the estimator, and $K(.)$ is the kernel function) over all the samples and normalizing such that the estimate is itself a density, i.e., $$\hat{f}(x) = \frac{1}{Nh} \sum_{i=1}^{N} K\left(\frac{x-x_i}{h}\right)$$

The estimate $\hat{f}(x)$ directly inherits the properties of $K(.)$, hence it is common to choose the kernel shape itself to be some well-known smooth function, such as a Gaussian. For the multi-dimensional case, the product kernel is commonly used:

$$\hat{f}(x) = \frac{1}{Nh_1 \ldots h_d} \sum_{i=1}^{N} \left( \prod_{k=1}^{d} K\left(\frac{x^k - x_i^k}{h_k}\right) \right)$$

where $x^k$ denotes the component in dimension k of vector x, and the $h_i$ represent different bandwidths in each dimension.

Various studies have shown that the quality of the estimate is typically much more sensitive to the choice of the bandwidth h than it is to the kernel shape $K(.)$. Cross-validation techniques are usually the best method to estimate the bandwidths from the dam, although this can be computationally intensive and the resulting estimates can have a high variance across particular data sets. A significant disadvantage of kernel models is the fact that, all training data points must be stored and a distance measure between a new point and each of the stored points must be calculated for each class prediction. Another less obvious disadvantage is the lack of empirical results and experience with using these models for real-world applications—in particular there is a dearth of results for high-dimensional problems. In this context, a kernel approximation model is described which is considerably simpler both to train and implement than the full kernel model.

Appendix 5: Kernel Approximation using Mixture Densities

An obvious simplification to the full kernel model is to replace clusters of data points by representative centroids, to be referred to as the centroid kernel model. Intuitively, the sum of the responses from a number of kernels is approximated by a single kernel of appropriate width. Algorithms for bottom-up merging of data points for problems of this nature have been proposed. Here, however, a top-down approach is followed by observing that the kernel estimate is itself a special case of a mixture density. The underlying density is assumed to be a linear combination of L mixture components, i.e., $$f(x) = \sum_{i=1}^{L} \alpha_i f_i(x)$$

where the $\alpha_i$ are the mixing proportions. The full kernel estimate is itself a special case of a mixture model with $\alpha_i=1/N$ and $f_i(x)=K(x)$. Hence, the control kernel model can also be treated as a mixture model but now the parameters of the mixture model (the mixing proportions or weights, and the widths and locations of the centroid kernels) must be estimated from the data. There is a well-known and fast statistical procedure known as the EM (Expectation-Maximization) algorithm for iteratively calculating these parameters, given some initial estimates. Hence, the procedure for generating a centroid kernel model is straightforward: divide the training data into homogeneous subsets according to class labels and then fit a mixture model with L components to each class using the EM procedure (initialization can be based on randomly selected prototypes). Prediction of class labels then follows directly from Bayes' rule. Note that there is a strong similarity between mixture/kernel models and Radial Basis Function (RBF) networks. However, unlike the RBF models, the user does not train the output layer of the network in order to improve discriminative performance as this would potentially destroy the desired probability estimation properties of the model.

What is claimed is:

1. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time, wherein said defining plural transition probabilities comprises estimating a mean time between failures (MTBF) characteristic of each of said failure states and computing each corresponding transition probability therefrom;

observing a set of actual values of said parameters in a current one of said sampling intervals;

obtaining an instantaneous probability comprising an estimate of the probability of one of (a) said set of actual values being observed and (b) said system being in said one state, given the other of (a) and (b);

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto.

2. The method of claim 1 wherein said computing each corresponding transition probability comprises dividing the time period of said sampling intervals by said MTBF and subtracting the resulting quotient from unity.

3. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling intervals;

obtaining an instantaneous probability comprising an estimate of the probability of one of (a) said set of actual values being observed and (b) said system being in said one state, given the other of (a) and (b) wherein said obtaining an instantaneous probability comprises:

observing the frequency of each failure state of said system and the corresponding parameter values over a period of time relatively long compared to said sampling intervals, constructing a training data set associating the frequency of each failure state with different sets of corresponding parameter values, using a classification algorithm operating on said training data to infer from the parameter values observed during the current sampling interval said instantaneous probabilities of the current sampling interval;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto.

4. The method of claim 3 wherein said using a classification algorithm comprises:

training a neural network on said set of training data;

inputting the parameter values of said current sampling interval to said neural network while permitting said neural network to infer said instantaneous probabilities of the current sampling interval.

5. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling intervals;

obtaining an instantaneous probability comprising an estimate of the probability of one of (a) said set of actual values being observed and (b) said system being in said one state, given the other of (a) and (b) wherein said obtaining an instantaneous probability for a failure state is accomplished without training data related to that failure state and comprises:

determining for each parameter of that failure state upper and lower bounds on the possible values thereof, computing the instantaneous probability of that failure state from said upper and lower bounds;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto.

6. The method of claim 5 wherein said computing the instantaneous probabilities comprises multiplying together all reciprocals of the differences between said upper and lower bounds of the parameters of that failure state.

7. The method of claim 6 wherein there are only two system states: a normal state and a failure state.

8. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling intervals wherein said observing comprises monitoring measurements of input commands and performance variables of said system and converting said measurements to parameters indicative of changes in said measurements, and wherein said observing further comprises observing parameters comprising one of (a) autoregressive coefficients of said measurements, (b) variances of said measurements and (c) mean values of said measurements;

obtaining an instantaneous probability comprising an estimate of the probability of one of (a) said set of actual values being observed and (b) said system being in said one state, given the other of (a) and (b);

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto.

9. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time, wherein said defining plural transition probabilities comprises estimating a mean time between failures (MTBF) characteristic of each of said failure states and computing each corresponding transition probability therefrom;

observing a set of actual values of said parameters in a current one of said sampling intervals;

obtaining an instantaneous probability comprising an estimate of the probability of one of (a) said set of actual values being observed and (b) said system being in said one state, given the other of (a) and (b), wherein said obtaining further comprises an instantaneous estimate of the probability that said system is in said one state given said set of actual measurements, divided by an unconditional probability of said system being in said one state;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises equating said posterior probability with the intermediate probability computed for the current sampling interval.

10. The method of claim 9 wherein said computing each corresponding transition probability comprises dividing the time period of said sampling intervals by said MTBF and subtracting the resulting quotient from unity.

11. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters a current one of said sampling intervals;

obtaining an instantaneous probability comprising an estimate of the probability of one of (a) said set of actual values being observed and (b) said system being in said one state, given the other of (a) and (b), wherein said obtaining further comprises an instantaneous estimate of the probability that said system is in said one state given said set of actual measurements, divided by an unconditional probability of said system being in said one state wherein said obtaining an instantaneous probability further comprises:

observing the frequency of each failure state of said system and the corresponding parameter values over a period of time relatively long compared to said sampling intervals;

constructing a training data set associating the frequency of each failure state with different sets of corresponding parameter values;

using a classification algorithm operating on said training data to infer from the parameter values observed during the current sampling interval said instantaneous probabilities of the current sampling interval;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises equating said posterior probability with the intermediate probability computed for the current sampling interval.

12. The method of claim 11 wherein said using a classification algorithm comprises:

training a neural network on said set of training data;

inputting the parameter values of said current sampling interval to said neural network while permitting said neural network to infer said instantaneous probabilities of the current sampling interval.

13. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling intervals;

obtaining an instantaneous probability comprising an estimate of the probability of one of (a) said set of actual values being observed and (b) said system being in said one state, given the other of (a) and (b), wherein said obtaining further comprises an instantaneous estimate of the probability that said system is in said one state given said set of actual measurements, divided by an unconditional probability of said system being in said one state, wherein said obtaining an instantaneous probability for a failure state is accomplished without training data related to that failure state and comprises:

determining for each parameter of that failure state upper and lower bounds on the possible values thereof;

computing the instantaneous probability of that failure state from said upper and lower bounds;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises equating said posterior probability with the intermediate probability computed for the current sampling interval.

14. The method of claim 13 wherein said computing the instantaneous probabilities comprises multiplying together all reciprocals of the differences between said upper and lower bounds of the parameters of that failure state.

15. The method of claim 14 wherein there are only two system states: a normal state and a failure state.

16. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling intervals, wherein said observing comprises monitoring measurements of input commands and performance variables of said system and converting said measurements to parameters indicative of changes in said measurements and wherein said observing further comprises observing parameters comprising one of (a) autoregressive coefficients of said measurements, (b) variances of said measurements and (c) mean values of said measurements;

obtaining an instantaneous probability comprising an estimate of the probability of one of (a) said set of actual values being observed and (b) said system being in said one state, given the other of (a) and (b), wherein said obtaining further comprises an instantaneous estimate of the probability that said system is in said one state given said set of actual measurements, divided by an unconditional probability of said system being in said one state;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises equating said posterior probability with the intermediate probability computed for the current sampling interval.

17. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time, wherein said defining further comprises estimating a mean time between failures (MTBF) characteristic of each of said failure states and computing each corresponding transition probability therefrom;

observing a set of actual values of said parameters in a current one of said sampling intervals;

obtaining an instantaneous probability comprising an estimate of the probability of one of (a) said set of actual values being observed and (b) said system being in said one state, given the other of (a) and (b), wherein said obtaining further comprises obtaining a probability of the actual values of the current sampling interval being observed given said system being in said one state, and wherein said obtaining further comprises employing a classifier trained to output the instantaneous probability for each state in response to said set of actual values;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises dividing said intermediate probability by an unconditional probability of observing the sets of actual values of the current and previous sampling intervals.

18. The method of claim 17 wherein said computing each corresponding transition probability comprises dividing the time period of said sampling intervals by said MTBF and subtracting the resulting quotient from unity.

19. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any observing a set of actual values of said parameters in a current one of said sampling intervals;

obtaining an instantaneous probability comprising an estimate of the probability of one of (a) said set of actual values being observed and (b) said system being in said one state, given the other of (a) and (b), wherein said obtaining further comprises obtaining a probability of the actual values of the current sampling interval being observed given said system being in said one state, wherein said obtaining further comprises employing a classifier trained to output the instantaneous probability for each state in response to said set of actual values, and wherein said obtaining further comprises:

observing the frequency of each failure state of said system and the corresponding parameter values over a period of time relatively long compared to said sampling intervals;

constructing a training data set associating the frequency of each failure state with different sets of corresponding parameter values;

using a classification algorithm operating on said training data to infer from the parameter values observed during the current sampling interval said instantaneous probabilities of the current sampling interval;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises dividing said intermediate probability by an unconditional probability of observing the sets of actual values of the current and previous sampling intervals.

20. The method of claim 19 wherein said using a classification algorithm comprises:

training a neural network on said set of training data;

inputting the parameter values of said current sampling interval to said neural network while permitting said neural network to infer said instantaneous probabilities of the current sampling interval.

21. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling intervals;

obtaining an instantaneous probability comprising an estimate of the probability of one of (a) said set of actual values being observed and (b) said system being in said one state, given the other of (a) and (b), wherein said obtaining further comprises obtaining a probability of the actual values of the current sampling interval being observed given said system being in said one state, wherein said obtaining further comprises employing a classifier trained to output the instantaneous probability for each state in response to said set of actual values, wherein said obtaining an instantaneous probability for a failure state is accomplished without training data related to that failure state and comprises:

determining for each parameter of that failure state upper and lower bounds on the possible values thereof;

computing the instantaneous probability of that failure state from said upper and lower bounds;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises dividing said intermediate probability by an unconditional probability of observing the sets of actual values of the current and previous sampling intervals.

22. The method of claim 21 wherein said computing the instantaneous probabilities comprises multiplying together all reciprocals of the differences between said upper and lower bounds of the parameters of that failure state.

23. The method of claim 12 wherein there are only two system states: a normal state and a failure state.

24. A method of monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said method performed in successive sampling intervals and comprising:

defining plural transition probabilities for plural pairs of said states, each transition probability being related to the probability that said system will change from one to the other of said pairs of states at any time;

observing a set of actual values of said parameters in a current one of said sampling interval, wherein said observing comprises monitoring measurements of input commands and performance variables of said system and converting said measurements to parameters indicative of changes in said measurements, wherein said observing further comprises observing parameters comprising one of (a) autoregressive coefficients of said measurements, (b) variances of said measurements and (c) mean values of said measurements;

obtaining an instantaneous probability comprising an estimate of the probability of one of (a) said set of actual values being observed and (b) said system being in said one state, given the other of (a) and (b), wherein said obtaining further comprises obtaining a probability of the actual values of the current sampling interval being observed given said system being in said one state, wherein said obtaining further comprises employing a classifier trained to output the instantaneous probability for each state in response to said set of actual values;

computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and computing from the intermediate probability of the current sampling interval for each one of said states a posterior probability that said system is in the corresponding one of said states given the sets of actual values observed over the current and previous sampling intervals, and determining from the posterior probabilities of the plural states whether said system has transitioned to one of said failure states and, if said system has transitioned to one of said failure states, issuing an indication corresponding thereto, wherein said computing from the intermediate probability comprises dividing said intermediate probability by an unconditional probability of observing the sets of actual values of the current and previous sampling intervals.

25. Apparatus for monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said apparatus operable in successive sampling intervals, said apparatus comprising:

means for defining plural transition probabilities for plural pairs of said states, each transition probability being related to the probability that said system will change from one to the other of said pairs of states at any time, wherein said means for defining plural transition probabilities comprises means for estimating a mean time between failures (MTBF) characteristic of each of said failure states and computing each corresponding transition probability therefrom;

means for observing a set of actual values of said parameters in a current one of said sampling intervals;

means for obtaining an instantaneous probability comprising an estimate of the probability of one of (a) said set of actual values being observed and (b) said system being in said one state, given the other of (a) and (b);

means for computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and means for computing from the intermediate probability for each one of said states of the current sampling interval a posterior probability that said system is in the corresponding one of said states given the sets of actual values observed over the current and previous sampling intervals, and for determining from the posterior probabilities of the plural states whether said system has transitioned to one of said failure states and issuing an indication corresponding thereto.

26. The apparatus of claim 25 wherein said means for computing the corresponding transition probability comprises means for dividing the time period of said sampling intervals by said MTBF and subtracting the resulting quotient from unity.

27. Apparatus for monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said apparatus operable in successive sampling intervals, said apparatus comprising:

means for defining plural transition probabilities for plural pairs of said states, each transition probability being related to the probability that said system will change from one to the other of said pairs of states at any time;

means for observing a set of actual values of said parameters in a current one of said sampling intervals, wherein said means for observing said parameters comprises means for monitoring measurements of input commands and performance variables of said system and converting said measurements to parameters indicative of changes in said measurements;

means for obtaining an instantaneous probability comprising an estimate of the probability of one of (a) said set of actual values being observed and (b) said system being in said one state, given the other of (a) and (b), wherein said means for obtaining comprises means for obtaining an instantaneous estimate of the probability that said system is in said one state given said set of actual measurements, divided by an unconditional probability of said system being in said one state;

means for computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and means for computing from the intermediate probability for each one of said states of the current sampling interval a posterior probability that said system is in the corresponding one of said states given the sets of actual values observed over the current and previous sampling intervals, and for determining from the posterior probabilities of the plural states whether said system has transitioned to one of said failure states and issuing an indication corresponding thereto, wherein said means for computing from the intermediate probability comprises means for equating said posterior probability with the intermediate probability computed for the current sampling interval.

28. The apparatus of claim 27 wherein said means for observing further comprises means for observing parameters comprising one of (a) autoregressive coefficients of said measurements, (b) variances of said measurements and (c) mean values of said measurements.

29. Apparatus for monitoring a system having a normal working state corresponding to normal operation of said system and a plurality of individual failure states corresponding to different failure modes of said system, said system exhibiting respective sets of measurable parameters corresponding to inputs and behavior symptoms causally related to said inputs, said apparatus operable in successive sampling intervals, said apparatus comprising:

means for defining plural transition probabilities for plural pairs of said states, each transition probability being related to the probability that said system will change from one to the other of said pairs of states at any time, wherein said means for defining plural transition probabilities comprises means for estimating a mean time between failures (MTBF) characteristic of each of said failure states and computing each corresponding transition probability therefrom;

means for observing a set of actual values of said parameters in a current one of said sampling intervals;

means for obtaining an instantaneous probability comprising an estimate of the probability of one of (a) said set of actual values being observed and (b) said system being in said one state, given the other of (a) and (b), wherein said means for obtaining an instantaneous probability comprises means for obtaining a probability of the actual values of the current sampling interval being observed given said system being in said one state, and wherein said means for obtaining and instantaneous probability further comprises a classifier trained to output the instantaneous probability for each state in response to said set of actual values;

means for computing plural respective intermediate probabilities corresponding to respective ones of said states, each intermediate probability being equal to the corresponding instantaneous probability of said one state multiplied by a sum over plural states of the intermediate probability for a given state computed during the previous sampling interval multiplied by the transition probability between said given state and said one state; and means for computing from the intermediate probability for each one of said states of the current sampling interval a posterior probability that said system is in the corresponding one of said states given the sets of actual values observed over the current and previous sampling intervals, and for determining from the posterior probabilities of the plural states whether said system has transitioned to one of said failure states and issuing an indication corresponding thereto, wherein said means for computing from the intermediate probability comprises means for dividing said intermediate probability by an unconditional probability of observing the sets of actual values of the current and previous sampling intervals.

30. The apparatus of claim 29 wherein said means for computing each corresponding transition probability comprises means for dividing the time period of said sampling intervals by said MTBF and subtracting the resulting quotient from unity.

* * * * *